US008365215B2

(12) United States Patent
Hicks, III et al.

(10) Patent No.: US 8,365,215 B2
(45) Date of Patent: Jan. 29, 2013

(54) METHODS, SYSTEMS AND COMPUTER PROGRAM PRODUCTS FOR PROVIDING AD INSERTION VIA A MULTIMEDIA APPLICATIONS GATEWAY

(75) Inventors: John A. Hicks, III, Roswell, GA (US); Gerald M. Ezrol, Herndon, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 539 days.

(21) Appl. No.: 12/250,139

(22) Filed: Oct. 13, 2008

(65) Prior Publication Data

US 2009/0100460 A1    Apr. 16, 2009

Related U.S. Application Data

(60) Provisional application No. 60/979,173, filed on Oct. 11, 2007.

(51) Int. Cl.
*H04N 7/025* (2006.01)
(52) U.S. Cl. ............. 725/32; 725/34; 725/151; 709/230
(58) Field of Classification Search .................... 725/32, 725/34, 35, 151
See application file for complete search history.

(56) References Cited

U.S. PATENT DOCUMENTS

| | | | |
|---|---|---|---|
| 7,209,945 | B2 | 4/2007 | Hicks, III et al. |
| 7,376,414 | B2* | 5/2008 | Engstrom ................. 455/414.3 |
| 2002/0019984 | A1* | 2/2002 | Rakib ........................... 725/111 |
| 2002/0178445 | A1* | 11/2002 | Eldering et al. ................ 725/32 |
| 2003/0121037 | A1* | 6/2003 | Swix et al. ....................... 725/34 |
| 2005/0283796 | A1* | 12/2005 | Flickinger ........................ 725/35 |
| 2006/0026633 | A1* | 2/2006 | Pulitzer ............................. 725/32 |
| 2006/0195866 | A1* | 8/2006 | Thukral ............................ 725/34 |
| 2007/0283384 | A1* | 12/2007 | Haeuser et al. ................. 725/34 |
| 2008/0267076 | A1 | 10/2008 | Laperi et al. |
| 2008/0276267 | A1* | 11/2008 | Badt et al. ....................... 725/32 |
| 2009/0030942 | A1 | 1/2009 | Jiang |
| 2009/0086742 | A1 | 4/2009 | Ghai et al. |

OTHER PUBLICATIONS

U.S. Appl. No. 12/250,128, filed Oct. 13, 2008.

* cited by examiner

*Primary Examiner* — Pankaj Kumar
*Assistant Examiner* — Timothy Newlin
(74) *Attorney, Agent, or Firm* — Cantor Colburn LLP

(57) ABSTRACT

Methods, systems, and computer program products for providing advertisement insertion to a user device are disclosed. A method includes providing a multimedia applications gateway (MAG) that is connected to an access gateway for a domain or a multimedia applications gateway that includes an integrated access gateway function, the access gateway in communication with user devices. The method also includes configuring the MAG to convert multimedia program content from a program source received at the access gateway and transmitted from the access gateway to a user device into a first communication having an open standards protocol recognized by each of the user devices, the first communication representing programming content. The method further includes configuring the MAG to convert multimedia advertising content into a second communication having the open standards protocol, the second communication representing advertising content. The method also includes retrieving the second communication from local memory, inserting the second communication within the first communication, and presenting the first and second communications on the device.

20 Claims, 20 Drawing Sheets

METHODS, SYSTEMS AND COMPUTER PROGRAM PRODUCTS FOR PROVIDING AD INSERTION VIA A MULTIMEDIA APPLICATIONS GATEWAY

CROSS-REFERENCE TO RELATED APPLICATION

This application claims priority from U.S. Provisional Application No. 60/979,173, filed Oct. 11, 2007, the entire contents of which are herein incorporated by reference.

BACKGROUND OF THE INVENTION

Embodiments of the invention relate to providing electronic application programs/services and content to local sites and managing a home network. More particularly, embodiments of the invention relate to providing local advertisements insertion through a multimedia applications gateway supporting a number of applications and services in a home network.

Electronic application programs are used within a home or business for many reasons to assist people in their lives by establishing particular services. As such, the applications programs and the services they provide may be referred to collectively as application programs/services. For example, a personal computer may contain many application programs establishing services that allow an individual to interface with the computer to perform various tasks such as word processing, electronic mail, and scheduling. As more devices within a home or business are becoming electronic, the variety of application programs/services that work in conjunction with these devices is greatly expanding. Application programs/services now extend beyond those typically found on a personal computer that are focused on interaction with the user. For example, application programs/services now exist to provide customized control of security systems, heating and cooling systems, household appliances, and various other systems and devices.

An existing system for managing applications in a home network is described in U.S. Pat. No. 7,209,945, the entire contents of which are incorporated herein by reference. This patent discloses an application services gateway for managing various aspects of applications/services. While the existing application services gateway is well suited for its intended purposes, additional features may be added to the existing device. The multimedia applications gateway extends the capabilities of the applications services gateway, including the integration of LAN switch and communication gateway functionality into the multimedia applications gateway.

SUMMARY

In accordance with exemplary embodiments, methods for providing advertisement insertion to a user device are disclosed. A method includes providing a multimedia applications gateway (MAG) that is connected to an access gateway for a domain, the access gateway in communication with user devices. The method also includes integrating the access gateway function into the multimedia applications gateway. The method also includes configuring the MAG to convert multimedia program content from a program source received at the access gateway and transmitted from the access gateway to a user device into a first communication having an open standards protocol recognized by each of the user devices, the first communication representing programming content. The method further includes configuring the MAG to convert multimedia advertising content into a second communication having the open standards protocol, the second communication representing advertising content. The method also includes retrieving the second communication from local memory, inserting the second communication within the first communication, and presenting the first and second communications on the device.

In accordance with further exemplary embodiments, systems for providing advertisement insertion to a user device are disclosed. A system includes a multimedia applications gateway connected to an access gateway for the end user device of an end user domain, the access gateway communicatively coupled to end user devices at the end user domain. The system also includes an application executing on the multimedia applications gateway, the application implementing a method. The method includes configuring the multimedia applications gateway to convert multimedia program content from a program media source received at the access gateway and transmitted from the access gateway to at least one of the end user devices into a first communication having an open standards protocol recognized by each of the end user devices, the first communication representing programming content. The method also includes configuring the multimedia applications gateway to convert multimedia advertising content, transmitted by an advertising media source and received at the multimedia applications gateway, into a second communication having an open standards protocol recognized by each of the end user devices, the second communication representing advertising content. The method further includes storing the second communication in a local memory of the multimedia applications gateway, retrieving the second communication from the local memory, inserting the second communication at a location within the first communication, and presenting the first and second communications on at least one of the end user devices.

In accordance with yet further exemplary embodiments, computer program products for providing advertisement insertion to a user device are disclosed. A computer program product includes a computer-readable storage medium having program code stored thereon, the program code causing a computer to implement a method. The method includes providing a multimedia applications gateway (MAG) that is connected to an access gateway for a domain, the access gateway in communication with user devices. The method also includes configuring the MAG to convert multimedia program content from a program source received at the access gateway and transmitted from the access gateway to a user device into a first communication having an open standards protocol recognized by each of the user devices, the first communication representing programming content. The method further includes configuring the MAG to convert multimedia advertising content into a second communication having the open standards protocol, the second communication representing advertising content. The method also includes retrieving the second communication from local memory, inserting the second communication within the first communication, and presenting the first and second communications on the device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are identified alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments of the invention are directed to a multimedia applications gateway (MAG) in a variety of installations. The MAG is installed as part of a digital home network and provides centralized control of the home network. The MAG may include an integrated access gateway function. Through the MAG, the user may access proactive network management, performance monitoring and reporting, self help, improved diagnostic capability, remote management, and other operations. The MAG provides a consistent entertainment content experience, mass storage capabilities and provides access to Digital Living Network Alliance® (DLNA)-compliant set top boxes (STBs) and televisions (TVs). DLNA is an organization that provides specifications for enabling compatibility among electronic devices regardless of their manufacturer. The MAG architecture provides an open systems standards-based application execution platform that a service provider can remotely administer and manage.

Figure 1A:
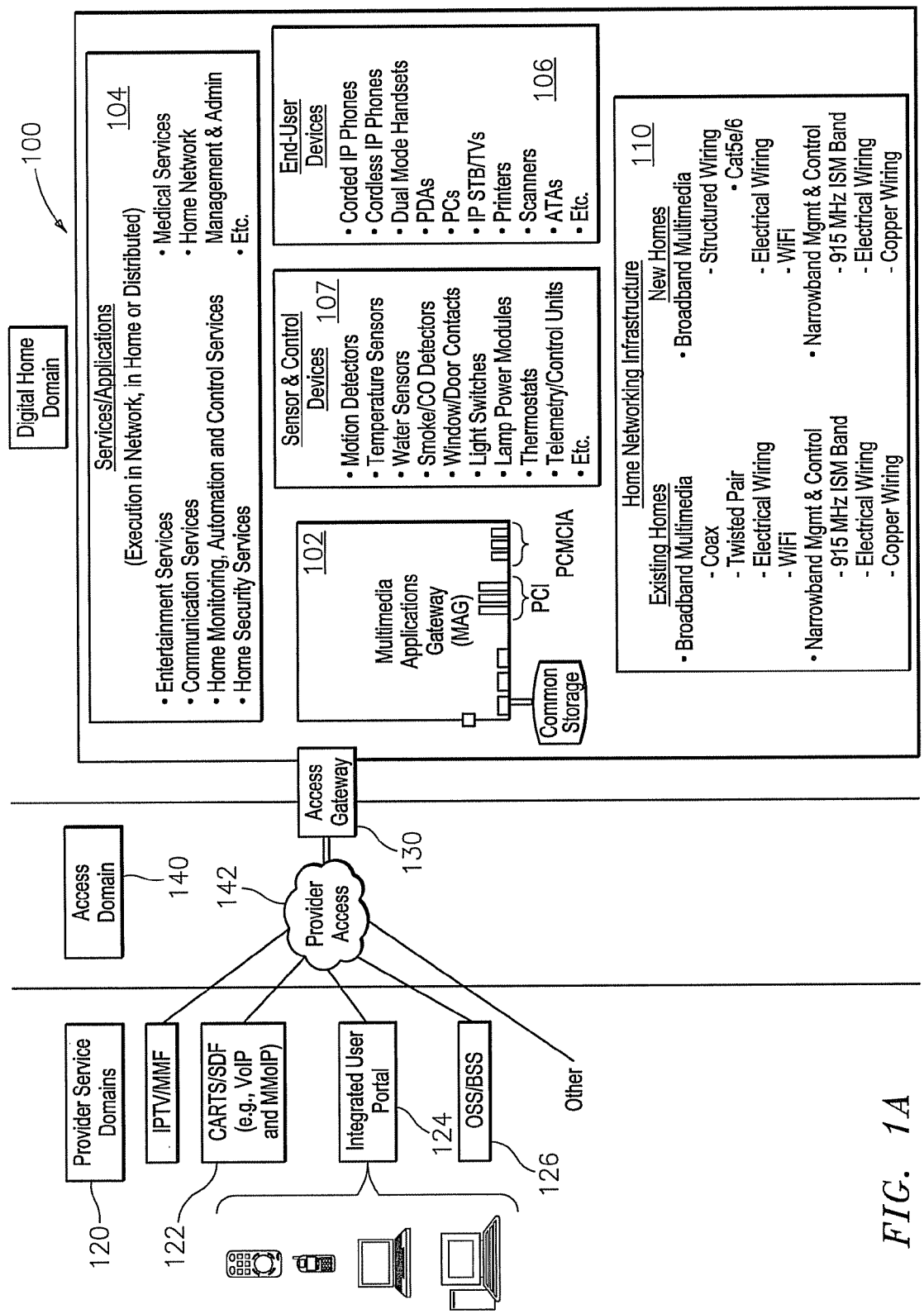
FIG. 1A and FIG. 1B are system diagrams illustrating a multimedia applications gateway (MAG) in a digital home domain in exemplary embodiments.
Figure 1B:
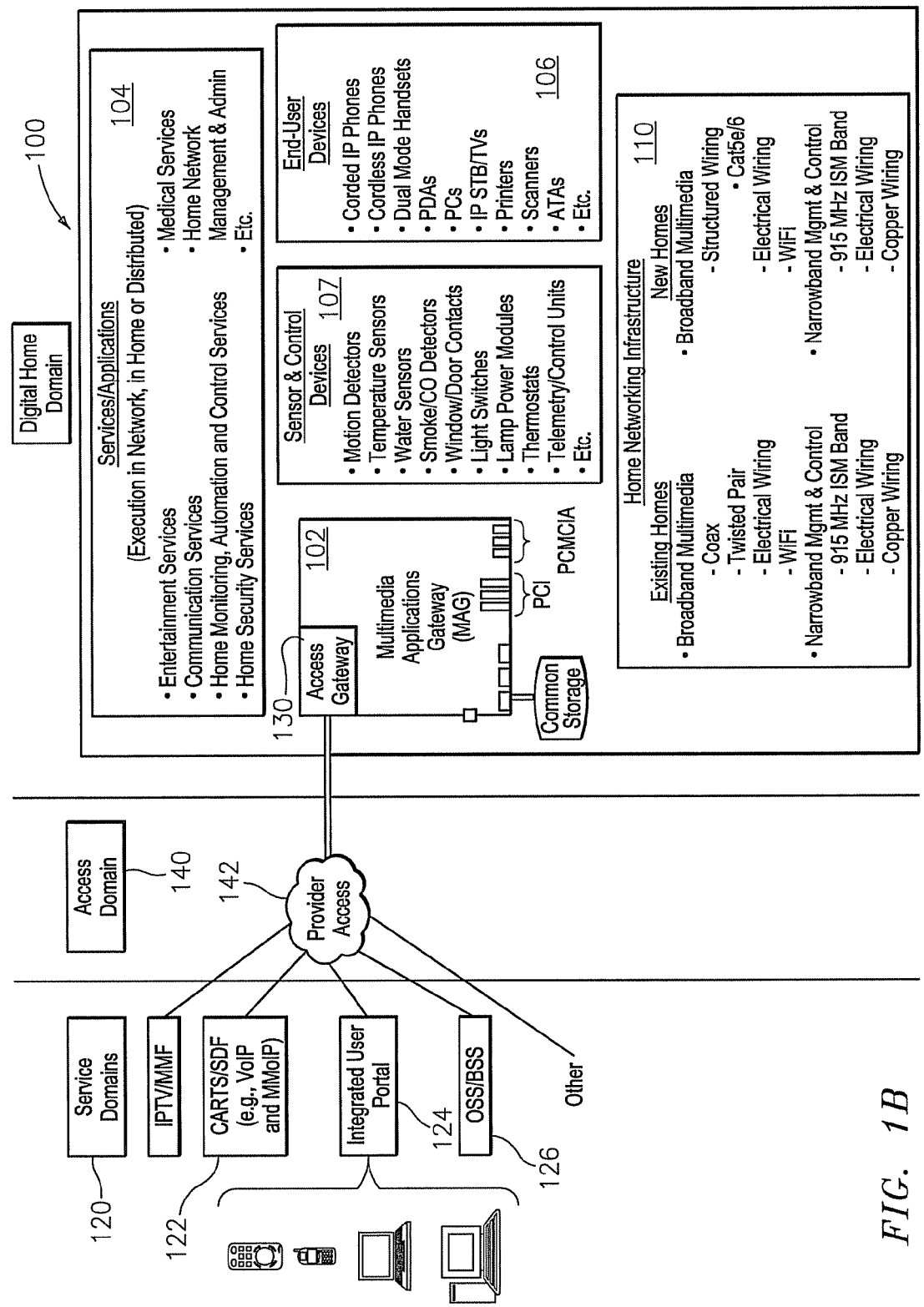

FIG. 1A is a system diagram illustrating a multimedia applications gateway (MAG) 102 in a digital home domain 100 (also referred to herein as end-user domain) in exemplary embodiments. FIG. 1B is a system diagram illustrating a MAG 102 including an integrated access gateway function. Referring to FIGS. 1A and 1B, the MAG 102 serves as a DLNA gateway supporting various sources such as Internet Protocol Television (IPTV) and Direct Broadcasting Satellite (DBS) in conjunction with DLNA compliant devices, including STBs and TVs. FIGS. 1A and 1B illustrate the MAG 102 and various services/applications 104, devices 106 and 107, and network infrastructure 110 interfaced with the MAG 102 in an exemplary embodiment. In the embodiment shown in FIG. 1A, the MAG 102 is installed behind an access gateway 130, which may be an iNID/residential gateway. In the embodiment shown in FIG. 1B, the MAG 102 is collocated with the residential gateway 130.

The system of FIGS. 1A and 1B also includes a provider service domain 120. The provider service domain 120 may be implemented by one or more high-speed computer processing devices (e.g., a mainframe computer). As shown in FIGS. 1A and 1B, a variety of applications and components in the provider service domain 120 may be implemented to support the MAG 102. An extension of a services platform (e.g., Common Architecture for Real-Time Services' (CARTS) Service Logic Execution Environment (SLEE)) 122 into the home of the digital home domain 100 provides the in-home service/application execution platform. The MAG 102 may be remotely managed/operated by a service provider of the provider service domain 120 by using a modular design featuring common software architecture and modular hardware components. When a customer of the digital home domain 100 orders applications (e.g., services/applications 104), these applications are automatically downloaded to the MAG 102. In an exemplary embodiment, the MAG 102 employs open-systems standards-based technology to achieve economy of scale. The MAG 102 services support a wide range of applications, such as: DLNA gateway functions (e.g., whole home digital video recording (DVR); push video-on-demand (VoD); local ad insertion; server for thin-client STBs; transcoding of digital rights management (DRM); and multi-device support); local ad insertion; home monitoring, automation and control (e.g., video monitoring and local archiving of streaming video; home monitoring and control; lighting control and management; and energy control and management, to name a few); customer owned multimedia content storage and distribution with remote access; remote utility meter reading (e.g., electricity, natural gas and water); IP private branch exchange (PBX); biomedical monitoring; pre-positioned multimedia content with local caching; and personal computer (PC) backup, to name a few.

Other components of the provider service domain 120 may include an integrated user portal 124, supporting applications, such as operation support systems (OSS) and/or business support systems (BSS), collectively OSS/BSS 126, as well as other applications desired by the provider service domain 120. The integrated user portal 124 may include a user interface that is accessible to customers, such as the customer of the digital home domain 100, and may be used to download services/applications 104 and access remote monitoring services from the provider service domain 120, as described further herein.

In an exemplary embodiment, the system of FIGS. 1A and 1B also includes an access domain 140, which may include a provider access network 142. The provider access network 142 enables access or residential gateways (e.g., access gateway 130 of the digital home domain 100) to communicate with the provider service domain 120.

As indicated above, the MAG device 102 may be installed behind the residential or access gateway/iNID (Intelligent Network Interface Device) 130 (as shown in FIG. 1A), or may be collocated with the access gateway 130 (as shown in FIG. 1B). The access gateway 130, in turn, provides connection via, e.g., coaxial cable, electrical and twisted pair wiring, and wireless technologies to wide range of devices via the home networking infrastructure 110 of the digital home domain 100. The iNID is an implementation of an access gateway wherein the access gateway is physically installed on the outside on the home in place of the NID (Network Interface Device).

Figure 2:
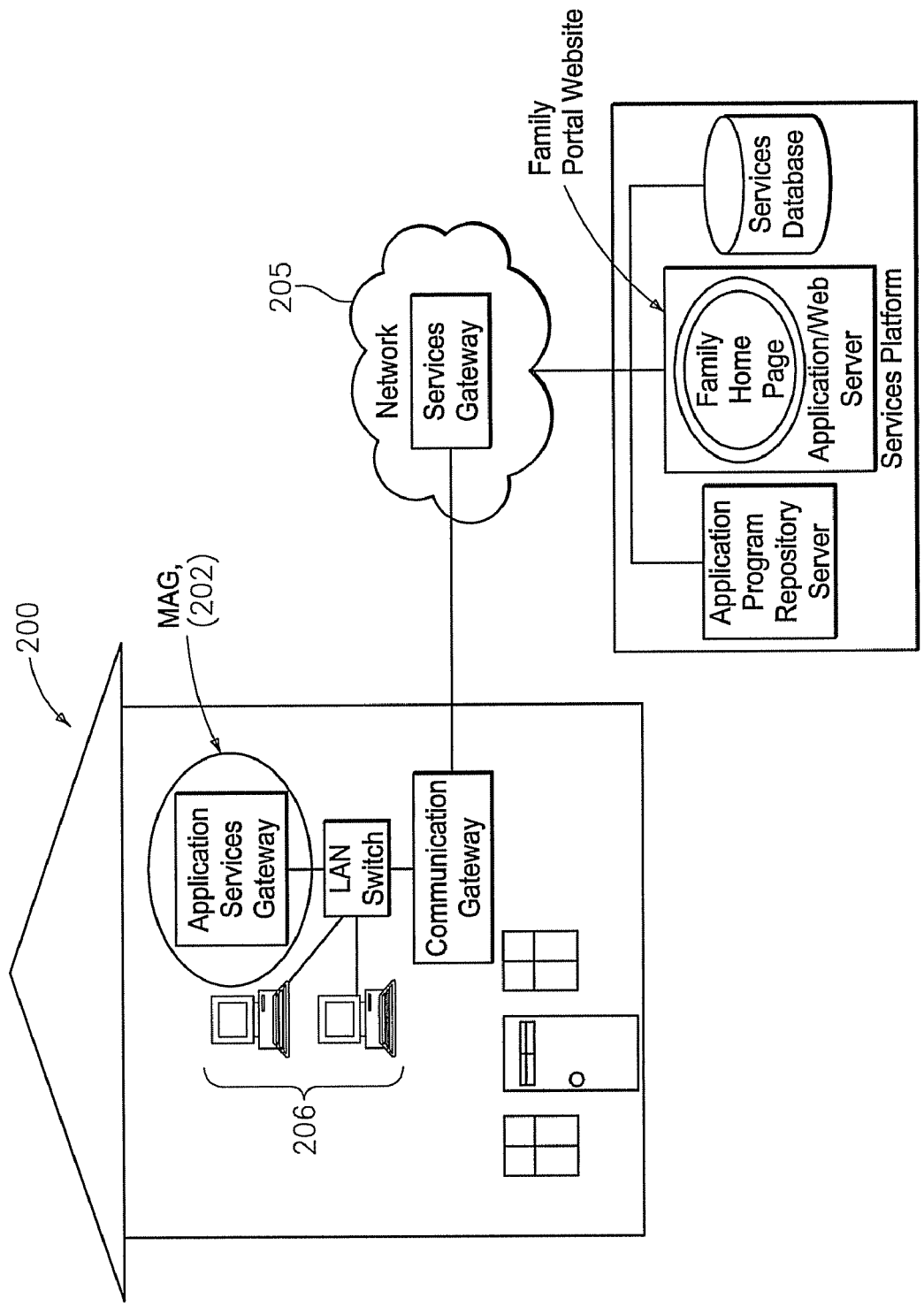
FIG. 2 illustrates using a MAG in place of an existing application services gateway in accordance with exemplary embodiments.

FIG. 2 illustrates a diagram in which a MAG 202 is used in place of an existing application services gateway, such as that described in U.S. Pat. No. 7,209,945. The application services gateway described in '945 executes electronic application programs/services that allow the application programs/services to be managed and administered out of a network, e.g., the network 205, rather than locally. The application services gateways are described as elements in a services delivery system that execute application programs/services and which control or interact with systems and devices (e.g., devices 206) of a home (e.g., home 200) or business.

Figure 3A:
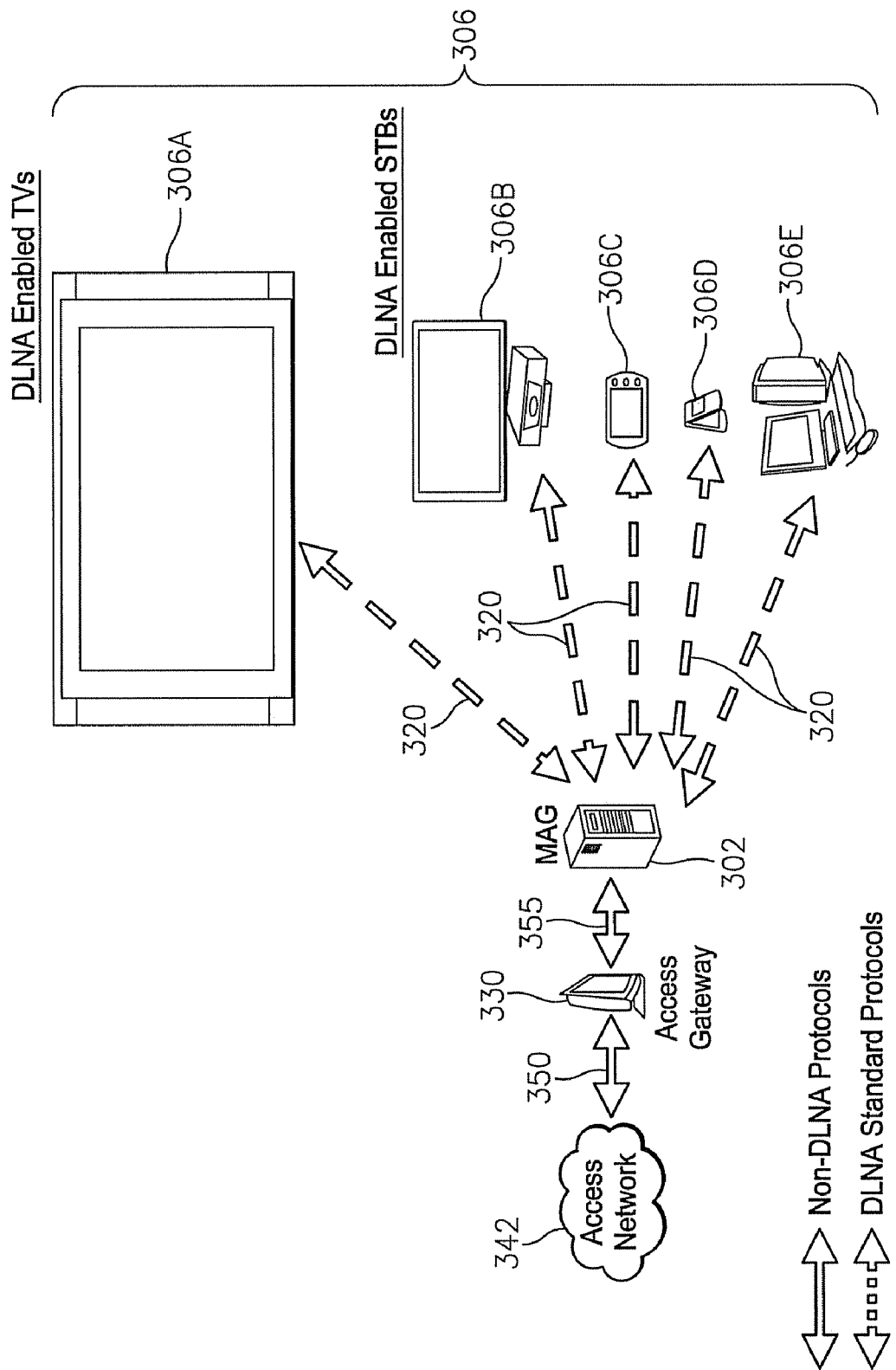
FIG. 3A and FIG. 3B illustrate a MAG in a television viewing scenario in exemplary embodiments.
Figure 3B:
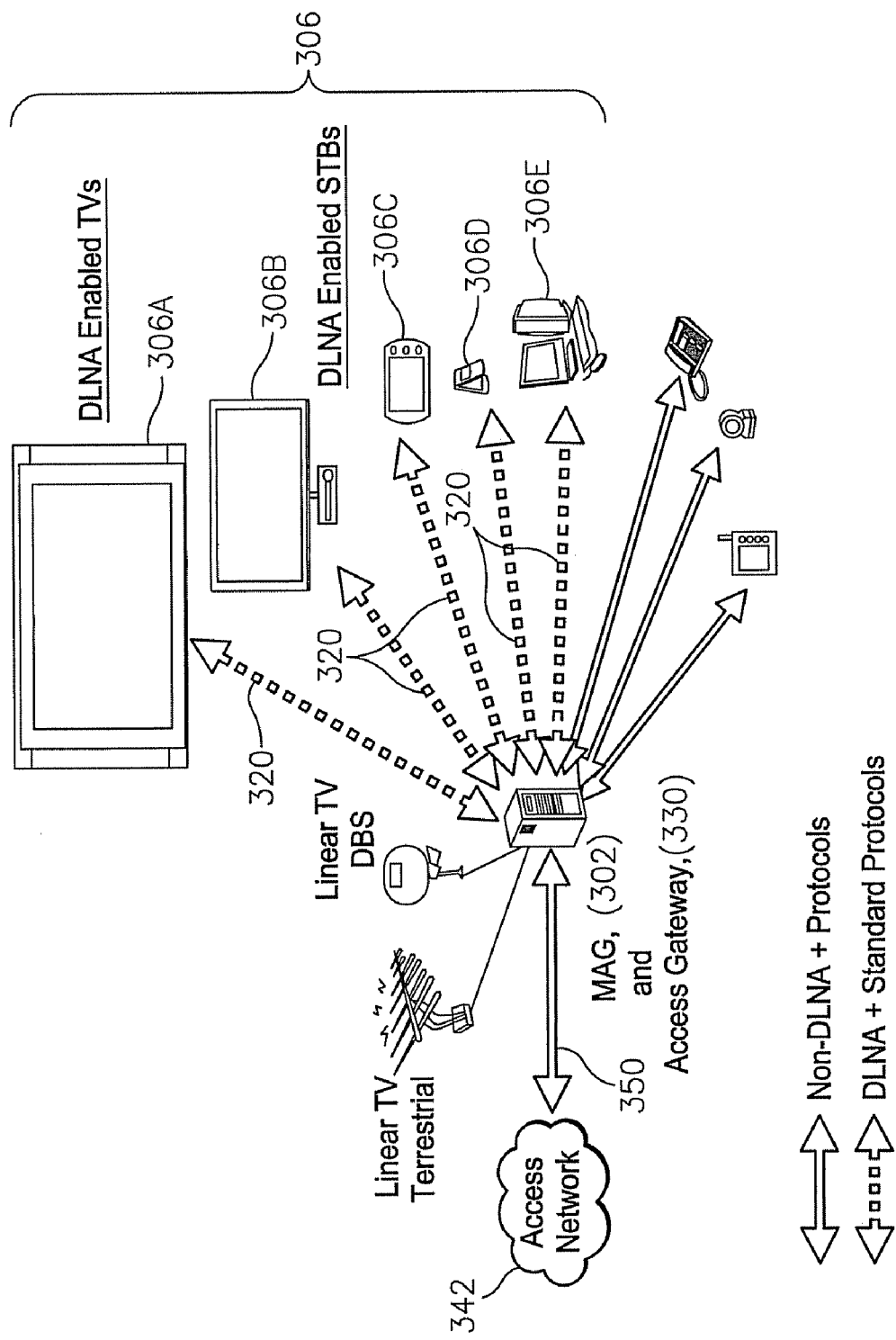

FIGS. 3A and FIG. 3B depict a MAG 302 in a television viewing scenario in exemplary embodiments. In the embodiment shown in FIG. 3A, the MAG 302 is installed behind an access gateway 330, which may be an iNID/residential gateway. In the embodiment shown in FIG. 3B, the MAG 302 is collocated with the residential gateway 330. With reference to FIGS. 3A and 3Bt, the MAG 302 interfaces with a number of DLNA enabled devices 306 in a home (e.g., the digital home domain 100 of FIGS. 1A and 1B) and serves as a DLNA gateway between a provider access network 342 (and an access gateway 330) and the DLNA enabled devices 306. The MAG 302 is able to terminate proprietary Conditional Access/Digital Rights Management (CA/DRM) communications protocols 350 and convert them to an open standards protocol 355 (e.g., Open Standards Link Protection Protocol). The MAG 302 may serve as a proprietary IPTV client with conversion to DLNA standard protocols 320. In one exemplary embodiment, the MAG 302 exposes electronic programming guides (EPGs) and/or interactive programming guides (IPGs) to the DLNA enabled devices 306, such as TVs and STBs, via DLNA remote user interface standards. In another exemplary embodiment, the MAG 302 exposes a content select application programming interface (API) to the DLNA enabled devices 306 (e.g., TVs and STBs) via DLNA content discovery standards. In addition, the MAG 302 may serve secure digital media streams to the DLNA enabled devices 306 (via DLNA standards). As shown in FIGS. 3A and 3B, the DLNA enabled devices include, but are not limited to TVs 306A, STBs 306B, PCs 306E, cell phones 306D, and personal media players 306C. The DLNA devices 306 may also be referred to herein as end-user devices as shown, e.g., in FIGS. 1A and 1B. The end-user devices listed in FIGS. 1A and 1B include corded IP phones, cordless IP phones, dual mode handsets, personal digital assistants, printers, and scanners, to name a few.

In an exemplary embodiment, the DLNA enabled TVs 306A communicate intelligently with the MAG 302 over an in-home network (e.g., via the home networking infrastructure 110 of the digital home domain 100 of FIGS. 1A and 1B), decode digital streams locally, and render an EPG/IPG per the provider's desired look and feel. In another exemplary embodiment, the DLNA enabled STBs 306B and other devices, such as devices 306C, 306D, and 306E, may communicate intelligently with the MAG 302 over the in-home network (e.g., via the home networking infrastructure 110 of the digital home domain, or end user domain 100), decode digital streams locally, and render an EPG/IPG per the provider's desired look and feel.

Figure 4A:
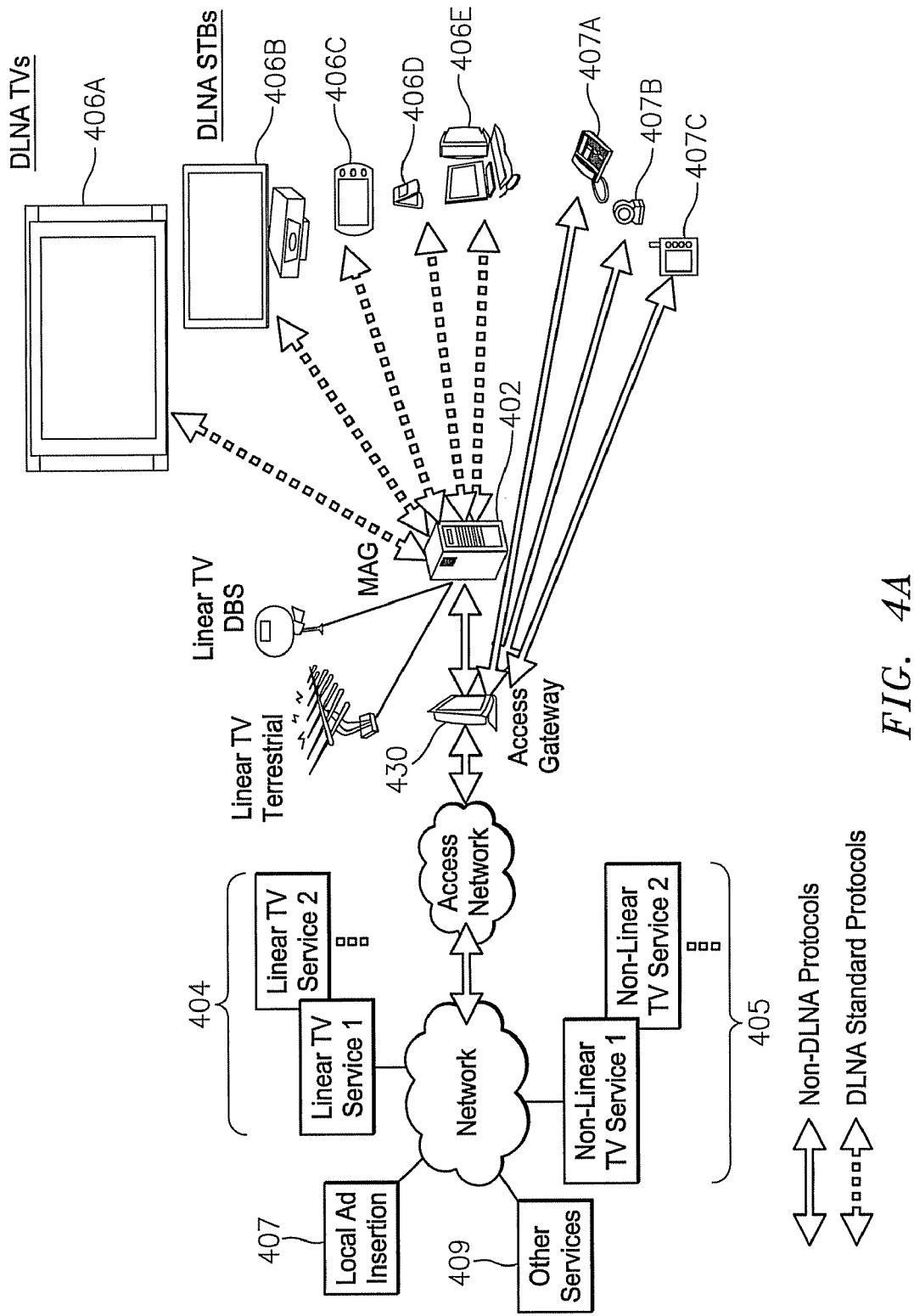
FIG. 4A and FIG. 4B illustrate a MAG in a television viewing scenario in exemplary alternate embodiments.
Figure 4B:
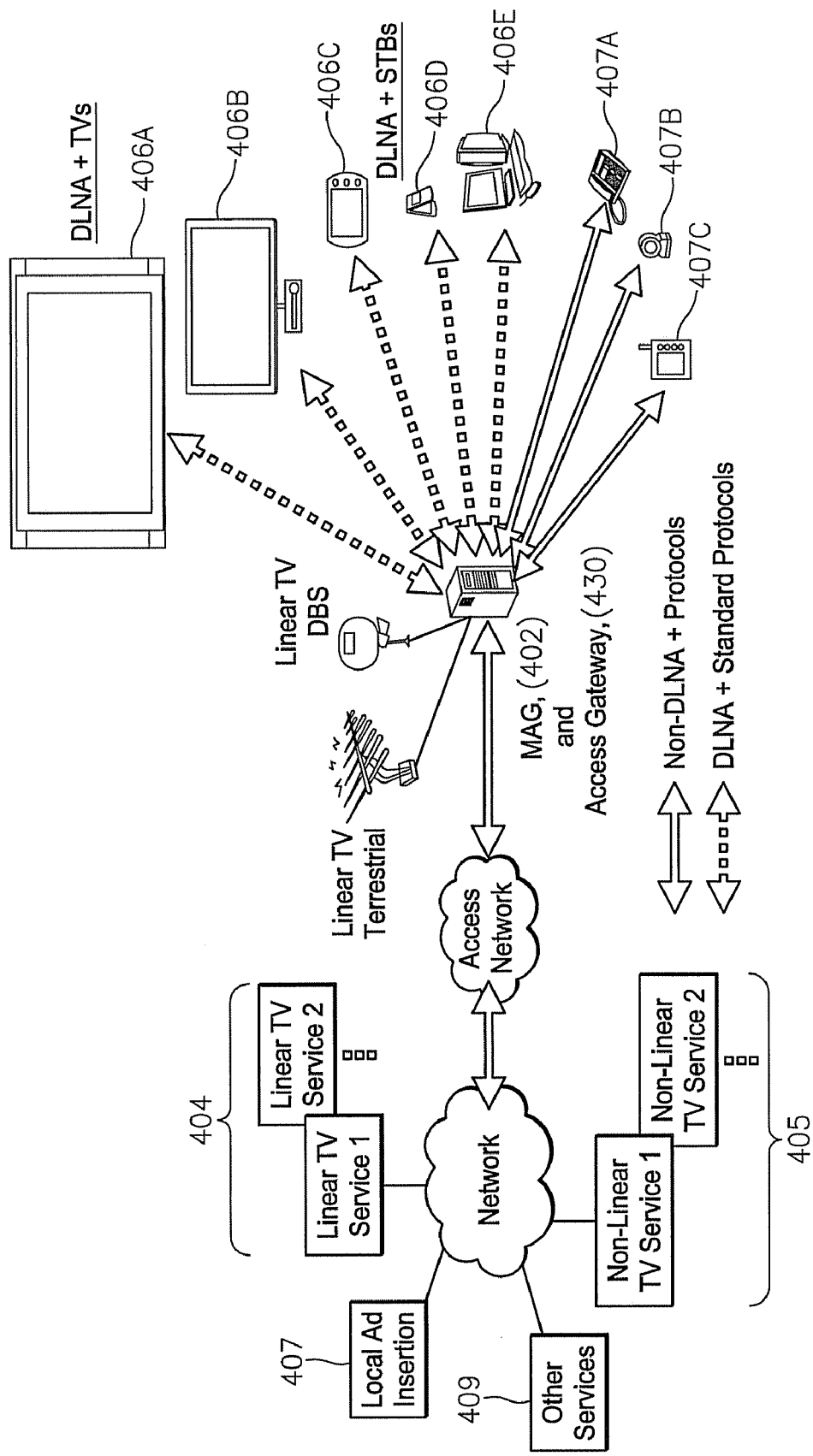

FIGS. 4A and 4B illustrate a MAG 402 in the context of a television viewing scenario in exemplary alternate embodiments. In the embodiment shown in FIG. 4A, the MAG 402 is installed behind an access gateway 430, which may be an iNID/residential gateway. In the embodiment shown in FIG. 4B, the MAG 402 is collocated with the residential gateway 430. With reference to FIGS. 4A and 4B, the MAG 402 provides a number of services including linear and non-linear TV 404 and 405, respectively, local ad insertion 407, and other services 409, e.g., home monitoring, automation and control, storage and distribution of multimedia content, biomedical monitoring, customer care, installation and repair, proactive home network management, provider certified plug and play devices, DLNA and gateway functions, entertainment, local call processing, IP multimedia subsystem (IMS) gateway, to name a few. Linear programming refers to standard television services in which a viewer watches scheduled programming at a particular time it is offered. By contrast, non-linear programming may include video on demand (VOD), interactive programming, and DVR recorded programming. In the exemplary embodiments of FIGS. 4A and 4B, the MAG 402 interfaces with DLNA enabled devices 406A-406E via an access gateway 430 (where the access gateway 430 is either separate from, or integrated with, the MAG 402), and the access gateway 430 directly interfaces with non-DLNA enabled devices, such as, but not limited to, a PSTN phone 407A, security devices 107B, and thermostat 407C using non-DLNA protocols. Other non-limiting examples of non-DLNA devices are listed in FIGS. 1A and 1B and are referred to herein as the sensor and control devices 107. The MAG 402 acts as a controller for remote monitoring services. It connects to a network (e.g., Internet) through an access gateway (e.g., access gateway 430) to the sensor and control devices 407 through power lines and to various sensors and lighting controls through a wireless link at the end user's domain (e.g., the digital home domain 100 of FIGS. 1A and 1B). These features are described further in FIGS. 10 and 11.

Figure 5A:
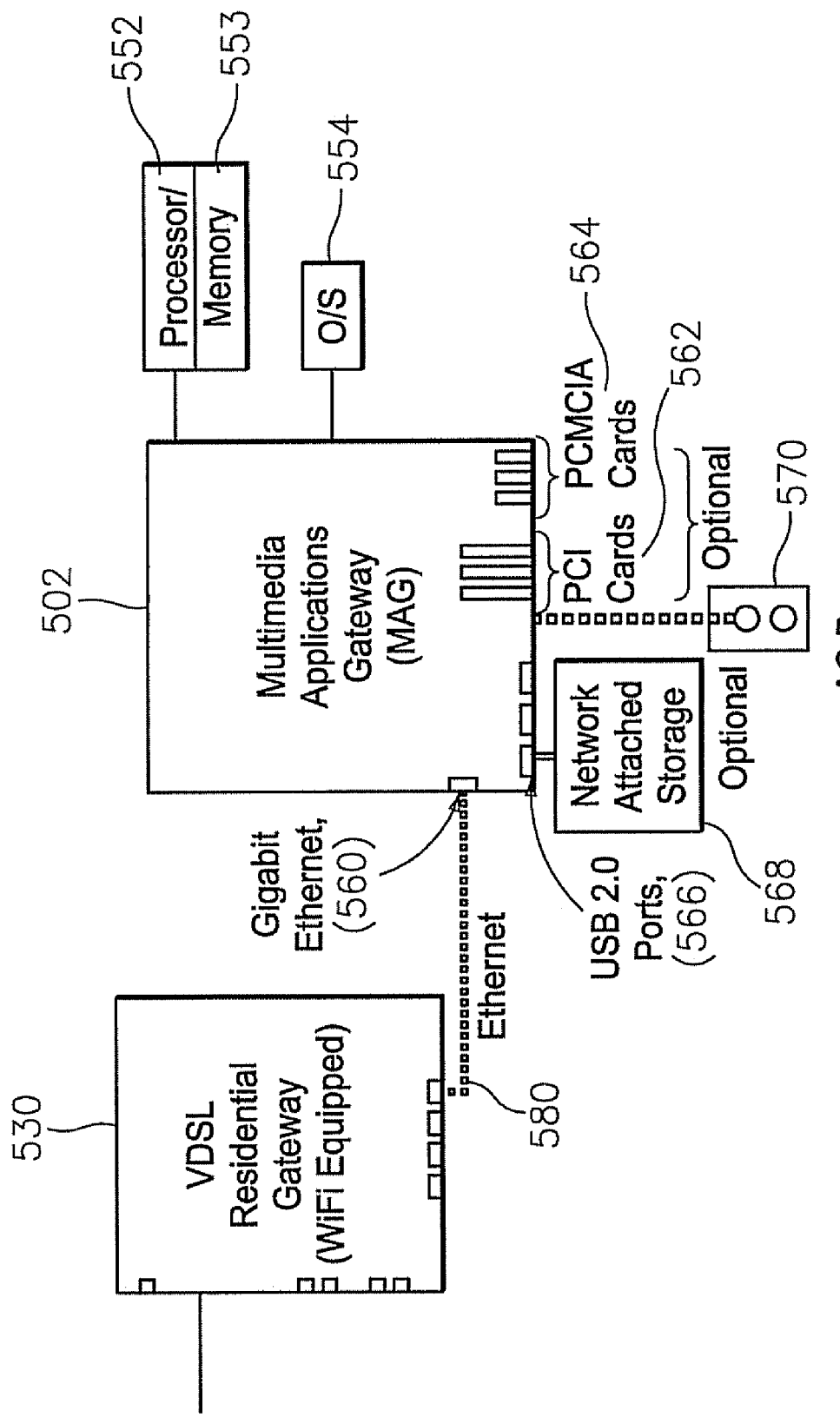
FIG. 5A and FIG. 5B illustrate physical interfaces to a MAG in exemplary embodiments.
Figure 5B:
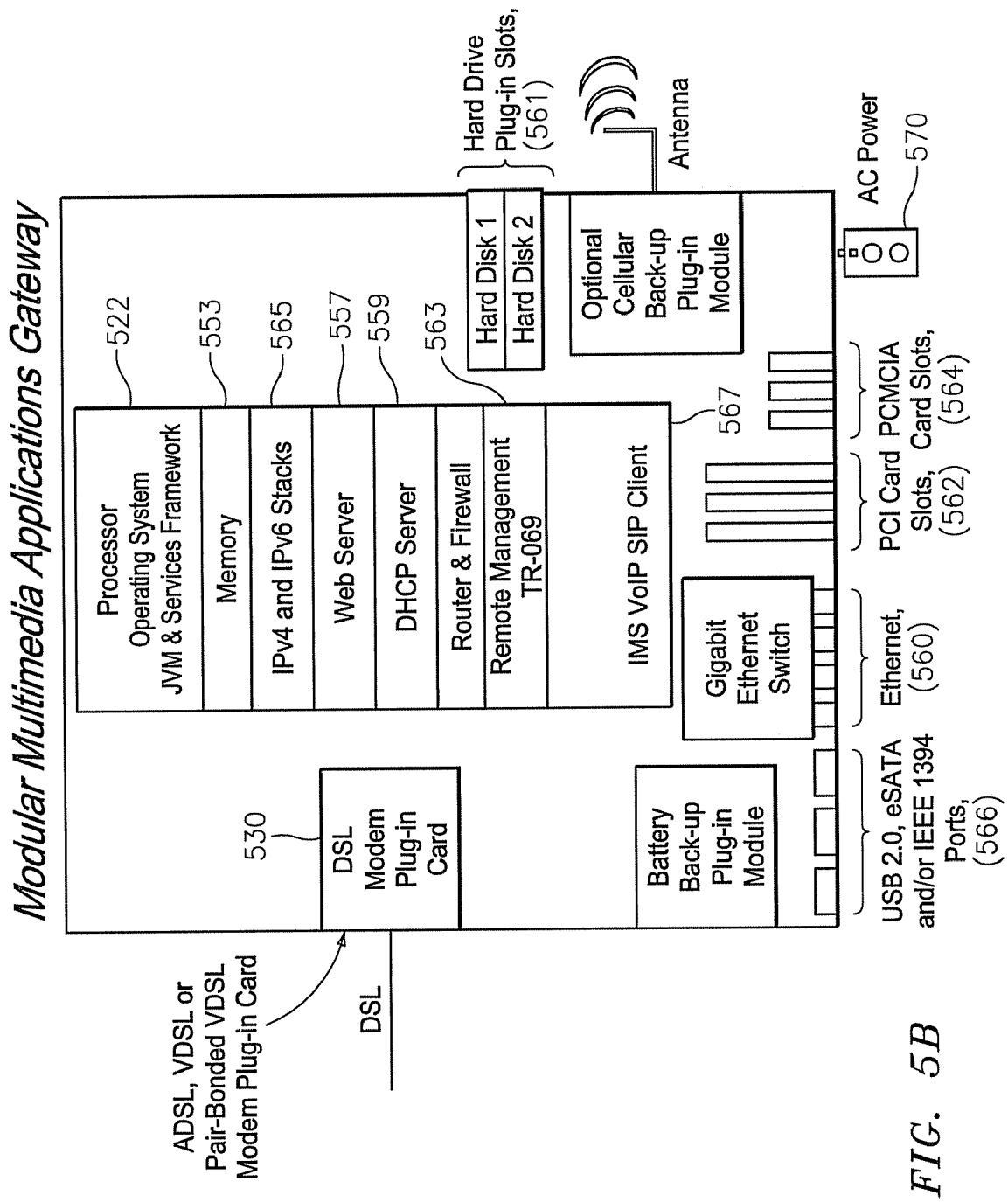

FIG. 5A and FIG. 5B are diagrams illustrating physical interfaces to a MAG 502 in exemplary embodiments. With reference to FIGS. 5A and 5B, the MAG 502 primary software application is a DLNA gateway function. The MAG 502 may utilize a common software architecture with modular hardware components, support a variety of plug-in cards, and include interfaces for attached storage and supports a wide range of applications. In an exemplary embodiment, the MAG 502 features a modular hardware design that provides physical interface options and storage options. The MAG 502 may be installed behind an access gateway 530 (as shown in FIG. 5A), which may be an iNID/residential gateway, or may be collocated with the residential gateway 530 (as shown in FIG. 5B).

As indicated above, the MAG 502 includes a variety of hardware elements. In one exemplary embodiment, the MAG 502 includes a gigabit Ethernet interface 560 for connection to a residential gateway (e.g., the access gateway 530), a processor 552 and memory 553, a real-time operating system 554 (shown in FIG. 5A), a virtual machine (e.g., Java® Virtual Machine (JVM) and services framework) (not shown), a dynamic host configuration protocol (DHCP) client 559 (shown in FIG. 5B), Web server 557 (shown in FIG. 5B), one or more hard drives 561 (shown in FIG. 5B), PCI and PCMCIA card slots 562 and 564, respectively, for plugging in optional interfaces (e.g., AT&T® U-verse Video plug-in card or AT&T® HomeZone plug-in card), eSATA, IEEE 1394 and/or USB 2.0 ports 566 for attaching optional peripherals, such as network attached storage 568, AC plugs for AC power 570, remote management TR-069 563 (shown in FIG. 5B), dual IPv4/IPv6 stack 565 (shown in FIG. 5B), and IMS SIP (session initiation protocol) Stack 567 (shown in FIG. 5B). In an exemplary embodiment, the processor 552 executes an application for enabling the MAG 502 to communicate with the provider service network and the end user devices which, in conjunction with the virtual machine, allow the MAG 502 to facilitate the application services described herein.

The MAG 502 may be installed out of sight in a customer's home in a basement, utility room, or closet adjacent to an AC power outlet and connected via Ethernet to the residential gateway or iNID 530. The MAG 502 may be customer installable by connecting Ethernet cable 580 to the residential gateway 530. The MAG 502 may also support plug-and-play installation.

Figure 6:
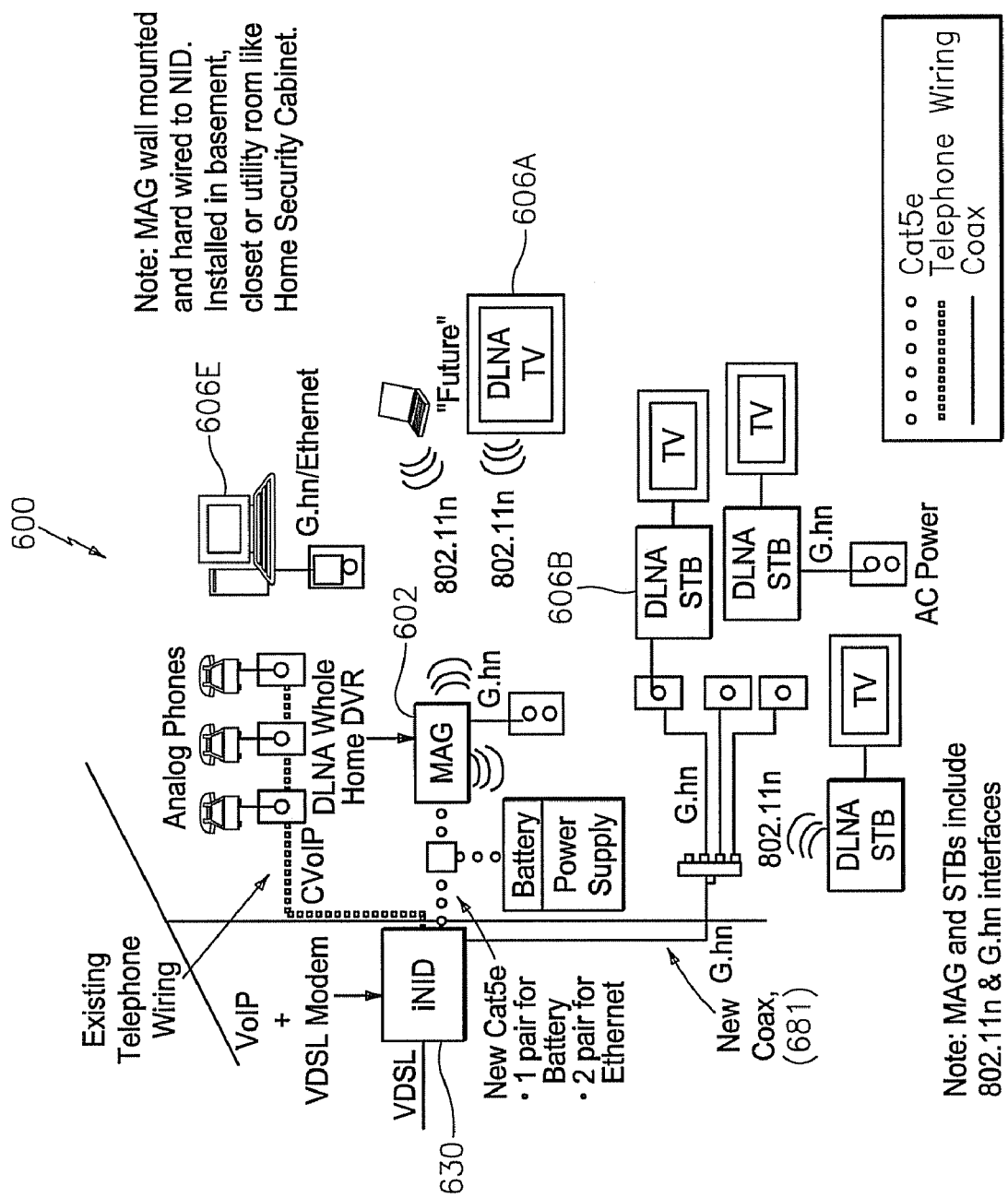
FIG. 6 illustrates a MAG serving as a gateway for DLNA devices in exemplary embodiments.
Figure 7:
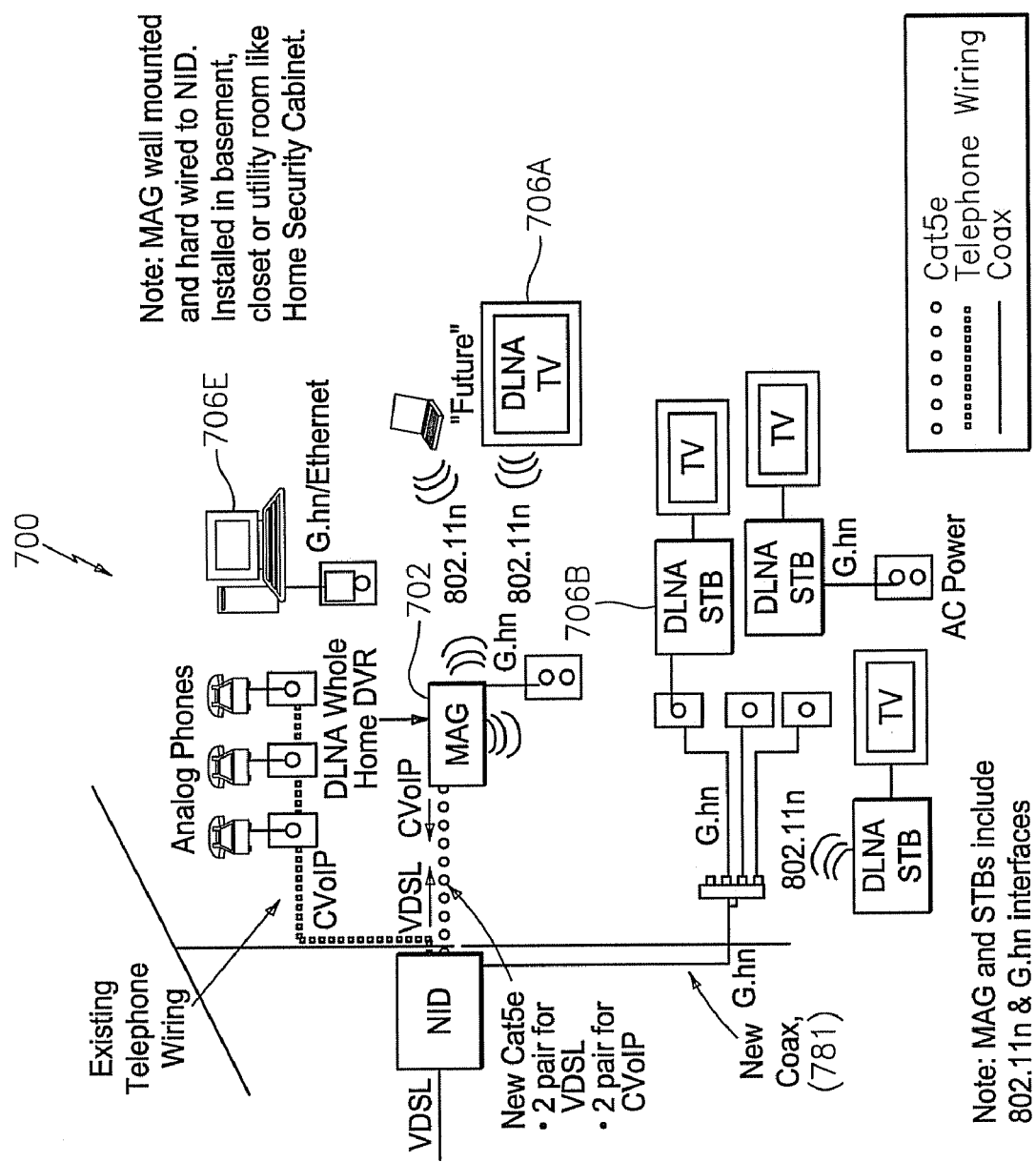
FIG. 7 illustrates a home with a MAG serving as a gateway for DLNA devices in exemplary embodiments.

FIG. 6 illustrates a diagram of a MAG 602 in the context of a home network for a home 600 in exemplary embodiments. The MAG 602 receives multimedia (e.g., IPTV media) routed through a residential gateway or iNID 630. In these embodiments, the MAG 602 serves as a DLNA gateway for DLNA enabled devices, such as STBs 606B, TVs 606A, and PCs 606E over, e.g., coaxial cable 681. FIG. 7 is a diagram illustrating a home 700 with a MAG 702 serving as a gateway for routing IPTV signals to DLNA enabled devices (e.g., television 706A, STB 706B, and home office computer 706E) over, e.g., a coaxial cable 781 in exemplary embodiments. The cable 681/781 may utilize a standards technology (e.g., HomePlug® AV or other HomePNA™-approved home networking standard) for enabling signals, e.g., IPTV signals, to be transmitted over existing cables in the end user domain, e.g., cable 681/781.

In the exemplary embodiments of FIGS. 6 and 7, the MAG 602/702 is equipped with an IPTV (e.g., AT&T® U-verse Video) plug-in module (e.g., PCI card 562 of FIGS. 5A and 5B). The MAG 602/702 operates as a DLNA gateway for DLNA enabled devices, such as the devices 606A, 606B, 606E and 706A, 706B, and 706E. The MAG 602/702 terminates the IPTV service (one of services/applications 104 provided by the provider service domain 120) in the home 600/700, including DRM, and distributes the service to DLNA compliant thin-client STBs and DLNA compliant TVs (e.g., devices 606/706) equipped with an integrated thin-client. The MAG 602/702 supports stream management, whole home DVR trick functions (i.e., playback features). The MAG 602/702 provides whole home DVR to STBs and other IP devices in the home 600/700 and supports multiple DRMs. The MAG 602/702 performs conversions between multiple encoding formats and resolutions and can replace IPTV formats (e.g., AT&T® U-verse Video DRM) with link protection protocol for securely sending video streams to different devices within the home 600/700. The MAG 602/702 may send encrypted content over the Internet to devices registered to the same customer.

Figure 8:
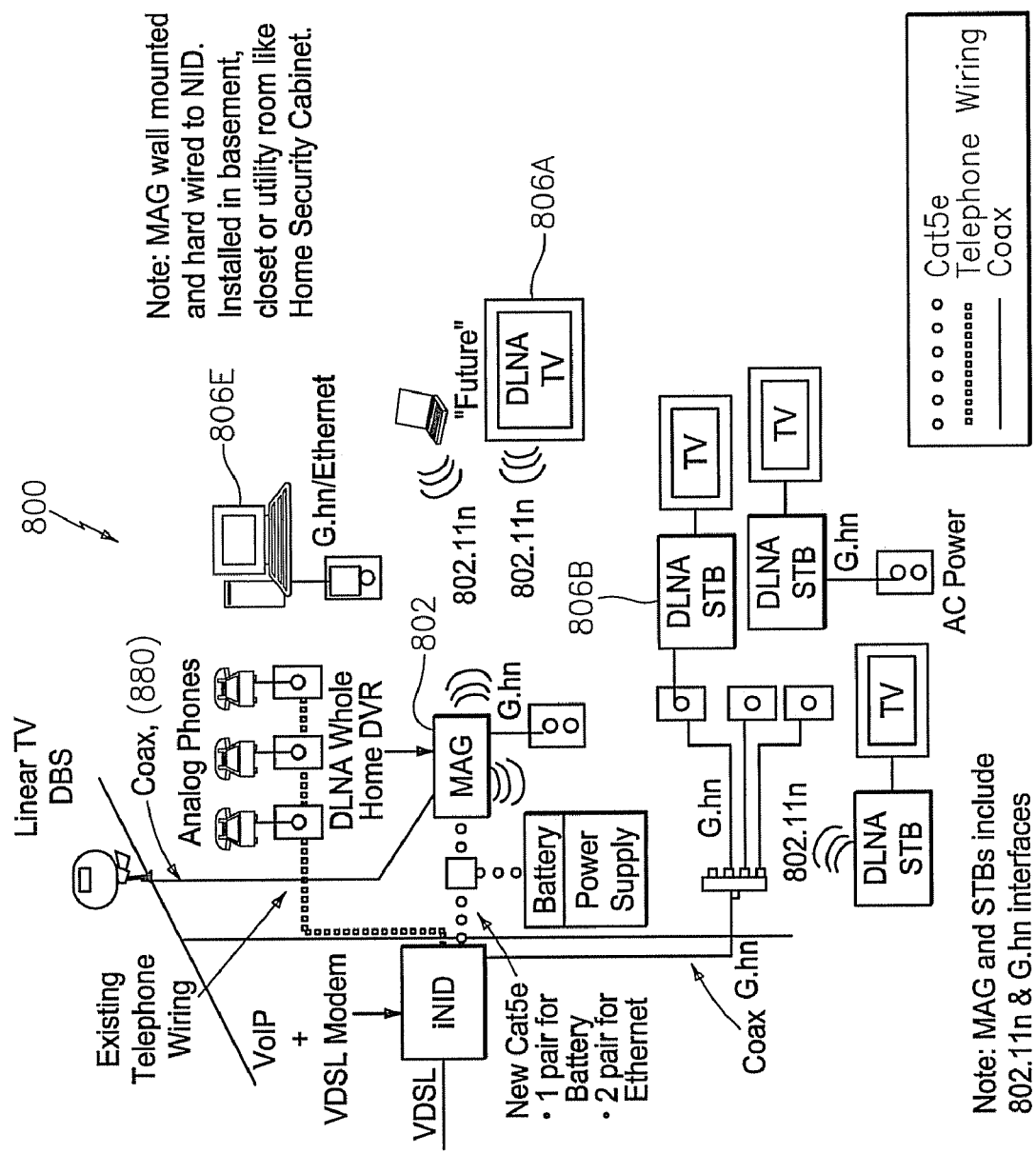
FIG. 8 illustrates alternate embodiments to FIG. 6 where the MAG interfaces with digital broadcast satellite.
Figure 9:
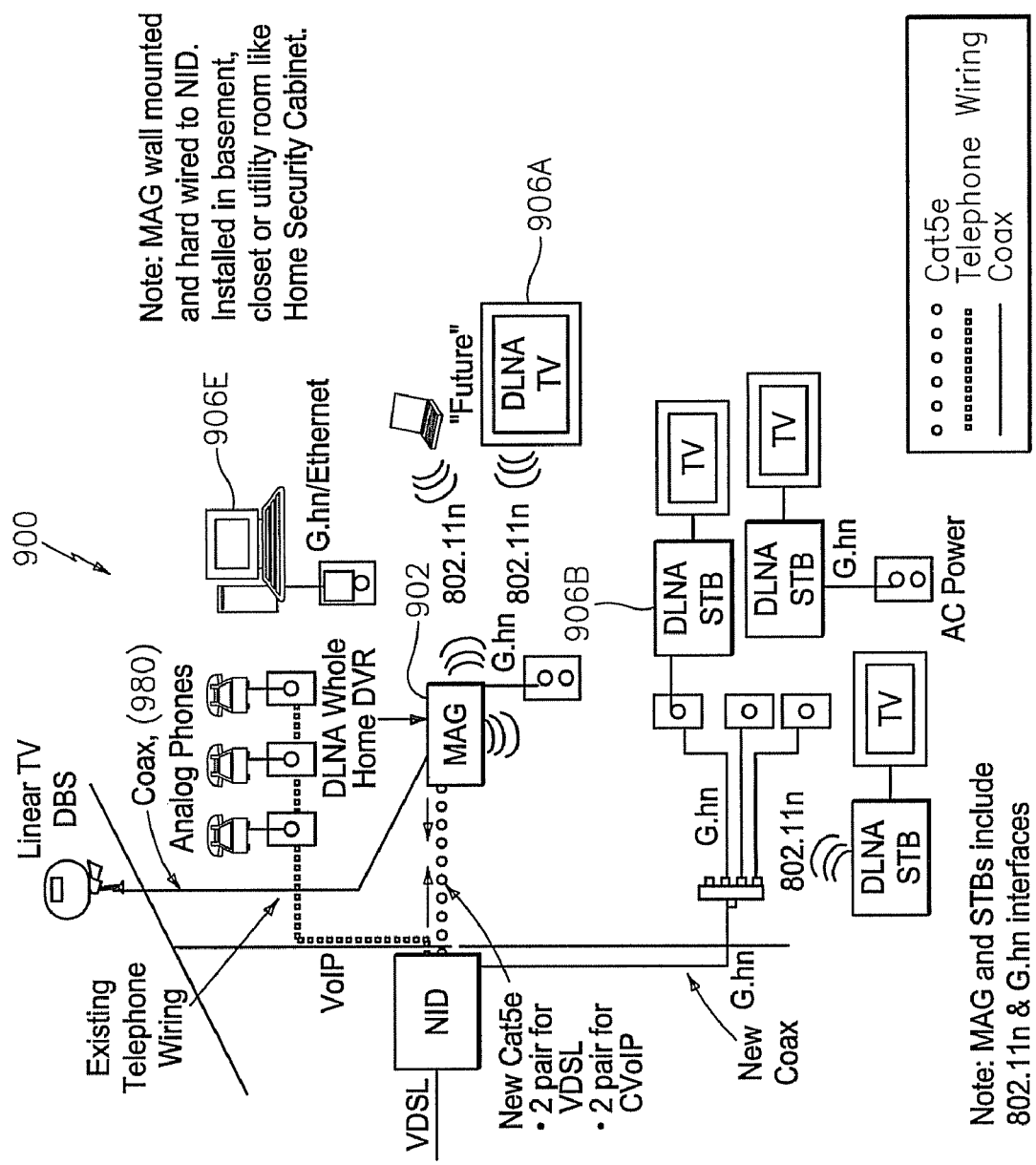
FIG. 9 illustrates alternate embodiments to FIG. 7 where the MAG interfaces with digital broadcast satellite.

FIG. 8 is a diagram illustrating a MAG 802 in the context of a home network for a home 800 in exemplary embodiments. The MAG 802 receives multimedia signals through a DBS feed routed to the MAG 802 over a coaxial cable 880. Embodiments are not limited to DBS sources of content and the MAG 802 may interface with a variety of multimedia providers in addition to DBS sources. In these embodiments, the MAG 802 serves as a DLNA gateway for DLNA enabled devices, such as STBs 806B, TVs 806A, PCs 806E (e.g., devices 806). FIG. 9 is a diagram illustrating a home 900 with a MAG 902 serving as a gateway for routing DBS signals 980 to DLNA enabled devices in exemplary embodiments.

In the embodiments of FIGS. 8 and 9, the MAG 802/902 is equipped with a DBS receiver (e.g., AT&T® Homezone plug-in module (PCI card)) and operates as a DLNA gateway to DLNA enabled devices, such as the STBs 806B/906B, TVs 806A/906A, and PCs 806E/906E. The MAG 802/902 terminates the DBS service in the home 800/900, including DRM, and distributes the service to DLNA compliant thin-client devices, such as DLNA compliant STBs and DLNA compliant TVs that are equipped with integrated thin-clients. The MAG 802/902 supports stream management, whole home DVR, and trick functions (i.e., playback features). The MAG 802/902 provides whole home DVR to STBs and other IP devices in the home, supports multiple DRMs, and is capable of conversions between multiple encoding formats and resolutions. The MAG 802/902 replaces existing DBS DRM with a link protection protocol for securely sending video streams to different devices within the home 800/900. The MAG 802/902 sends encrypted content over the Internet to devices registered to the same customer (e.g., devices within the home 800/900).

Figure 10:
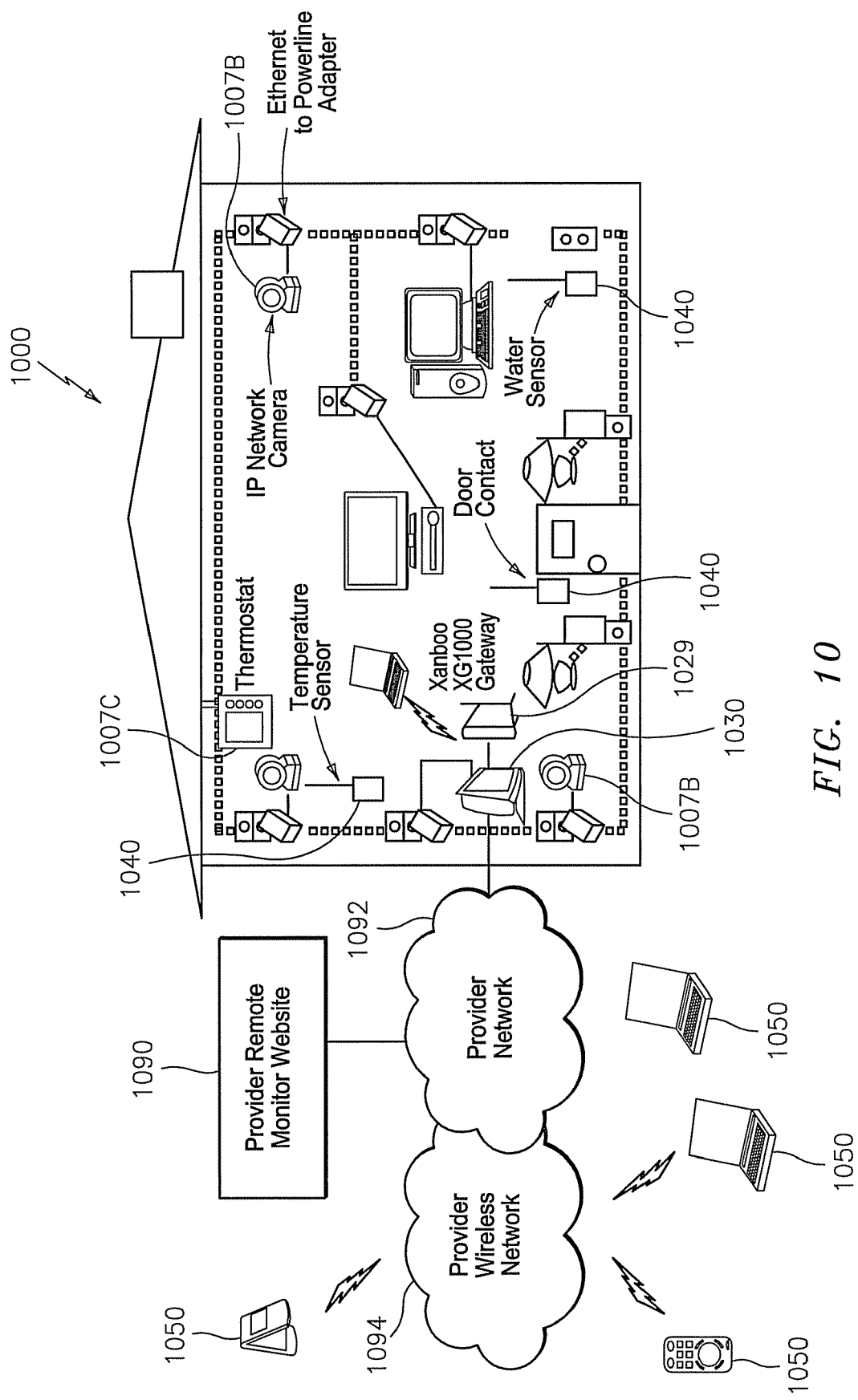
FIG. 10 illustrates a home monitoring system in exemplary embodiments.
Figure 11A:
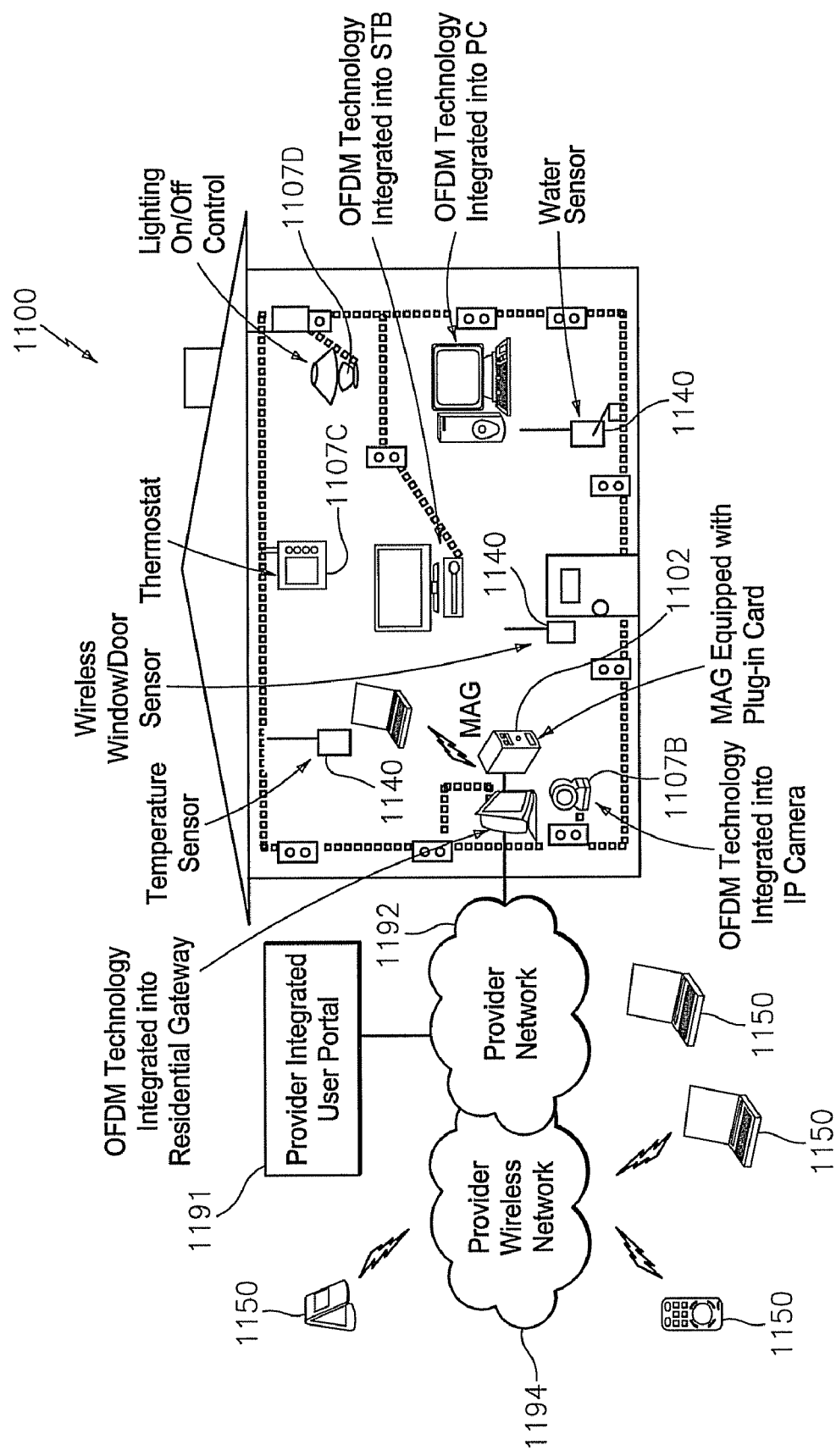
FIG. 11A and FIG. 11B illustrate a home monitoring system in alternate embodiments.
Figure 11B:
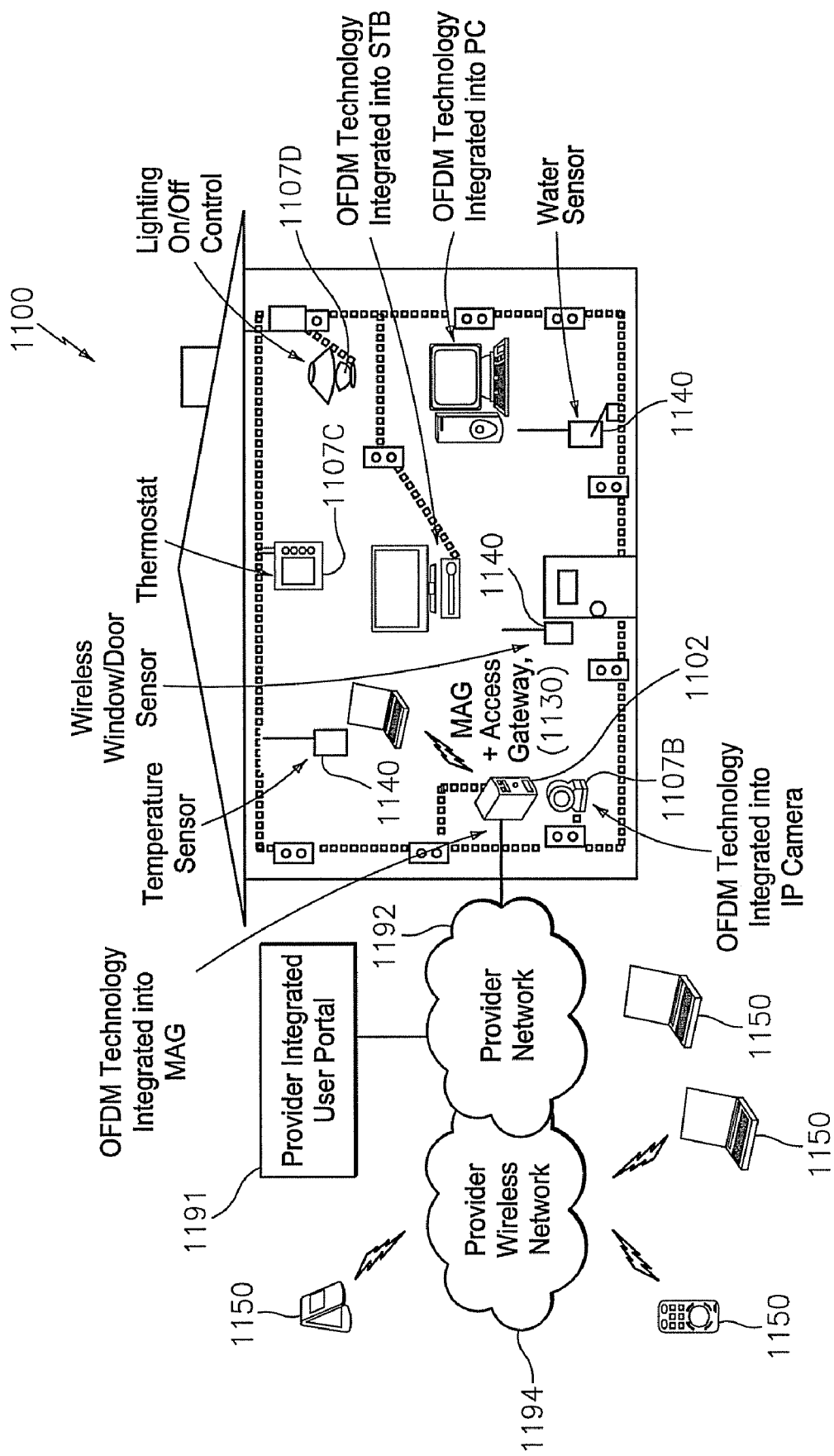

FIG. 10 is a diagram illustrating a home (remote) monitoring system for a home 1000 (e.g., end user domain) in exemplary embodiments. FIGS. 11A and 11B are diagrams depicting a home monitoring system for a home 1100 in alternate exemplary embodiments. With respect to FIG. 10, various sensors 1040 are employed through the home 1000 and provide sensor signals to a gateway 1029, such as Xanboo® XG1000, via an access gateway 1030, for transmission to a network (e.g., provider network 1092) and/or a wireless network (e.g., provider wireless network 1094). As shown in FIGS. 10, 11A and 11B, a provider wireless network 1094/1194 may deliver sensor signals to wireless devices 1050/1150 (e.g., cell phones, PDS, laptops, etc.). Users of the monitoring service may also access the sensor signals through a remote monitor website 1090 (FIG. 10) and/or a provider integrated user portal 1191 (FIGS. 11A and 11B) provided via the provider service network 1092/1094/1192/1194. In this manner, an end user may remotely monitor signals or activities detected by the sensor and control devices (e.g., thermostat 1007C/1107C, security camera 1007B/1107B, and light switch 1007D/1107D). The sensors 1040/1140 may be implemented by the sensor and control devices 107, a non-limiting list of which is illustrated in FIG. 1. The sensors may be configured to detect, e.g., motion, temperature, physical contact, the presence of water, the presence of carbon monoxide or smoke, biomedical feedback data, as well as other detectable behaviors. The sensor and control devices 107 may also include, e.g., light switches and power modules for appliances and other items in a home. The remote monitoring service enables an end user to activate remote monitoring service features that define a triggering event with respect to the sensors 1040/1140, such that upon occurrence of the triggering event, an alert or notification is transmitted to the end user via, e.g., email or text message. The triggering event is a measurable aspect of the sensors, such as a temperature limit, the detection of a defined concentration of carbon monoxide detected by a device, or any detectable motion identified by a device. In addition, the triggering event may activate one or more security cameras (e.g., device 1007B/1107B), which may, in turn, provide live video through the network of home 1000/1100 to the provider (e.g., the provider service domain 120), for access by an end user.

As shown in FIGS. 11A and 11B, a MAG 1102 is used to replace the gateway 1029 shown in FIG. 10 in the remote monitor service. In the embodiment shown in FIG. 11A, the MAG 1102 is installed behind an access gateway 1130, which may be an iNID/residential gateway. In the embodiment shown in FIG. 11B, the MAG 1102 is collocated with the residential gateway 1130. The remote monitor service system supports a wide range of applications with network-attached storage, including archiving streaming video. The home networking infrastructure includes a broadband multimedia network, which is OFDM-based (i.e., orthogonal frequency division multiplexing-based), such as HomePlug® AV, G.hn or other type of network that is designed for transmitting high-definition television (HDTV) and Voice-over-IP (VoIP) communications around the home 1100. The network infrastructure may also include narrowband management and control using, e.g., ZigBee technology.

Figure 12:
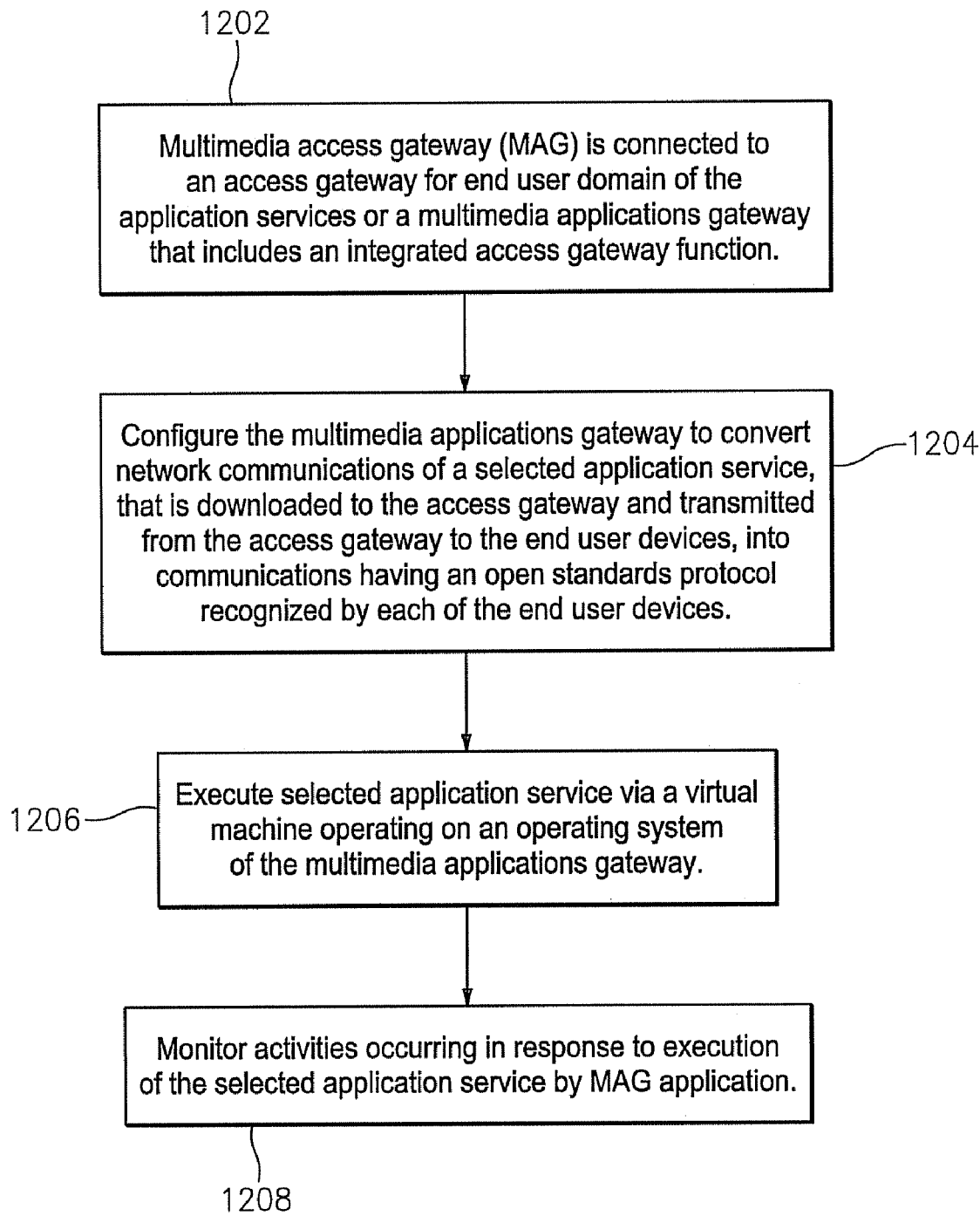
FIG. 12 is a flow diagram describing a process for implementing the MAG in accordance with exemplary embodiments.

Turning now to FIG. 12, a flow diagram describing a process for implementing the multimedia access gateway services will now be described in an exemplary embodiment. At step 1202, a multimedia access gateway (e.g., MAG 102) is connected to an access gateway (e.g., 130) for the end user domain of the application services (e.g., the embodiment shown in FIG. 1A) or a multimedia applications gateway that includes an integrated access gateway function (e.g., the embodiment shown in FIG. 1B). The access gateway is communicatively coupled to end user devices (e.g., devices 106/107) at the end user domain.

At step 1204, the multimedia applications gateway is configured to convert network communications of a selected application service that is downloaded to the access gateway and transmitted from the access gateway to at least one of the end user devices into communications having an open standards protocol (e.g., DLNA) recognized by each of the end user devices.

At step 1206, the selected application service is executed via a virtual machine (e.g., Java™) operating on an operating system (e.g., OS 554) of the multimedia applications gateway. At step 1208, activities occurring in response to execution of the selected application service are monitored by the MAG application.

Figure 13:
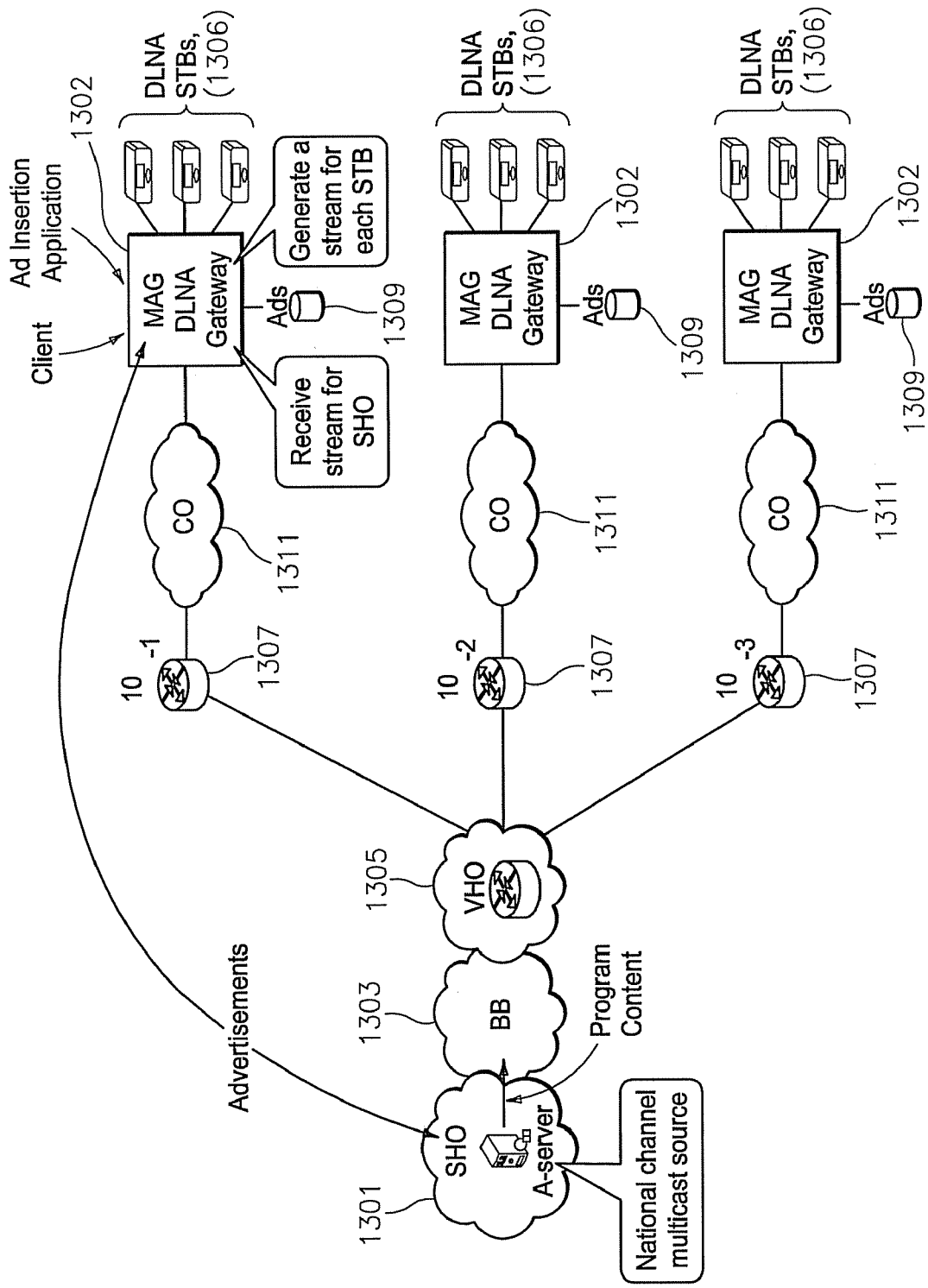
FIG. 13 illustrates a system for local ad insertion in exemplary embodiments.

FIG. 13 illustrates a system for local ad insertion in exemplary embodiments. As shown in FIG. 13, a super/master head end (SHO) 1301, or central head end, serves as a source for multimedia program content (also referred to herein as a first communication), such as a national channel multicast source. The content is distributed to MAGs (e.g., MAGs 1302) at consumer locations via an access gateway (e.g., iNID 1330 of FIG. 3), and through existing broadband (BB) 1303, video head end (VHO) 1305, intermediate offices (IO) 1307, and central office (CO) 1311 pathways. A MAG 1302 at a customer location has access to a local advertisement database 1309 that stores various local advertisements. The MAG 1302 executes a client application to interface with one or more advertisement distribution servers, e.g., SHO 1301, to receive advertising content (also referred to herein as a second communication). The MAG 1302 also executes an ad insertion application to retrieve advertisements from the database 1309 based on a number of factors. The advertisements may be pushed to the ad database 1309 periodically (e.g., weekly) and relate to local and/or national events, sales, promotions, etc. As the geographic location of the MAG 1302 is known, regionally targeted advertisements may be pushed to the ad database 1309. Ads (i.e., second communications) are retrieved from the ad database 1309 by the MAG 1302 during scheduled advertisement time slots and inserted into multimedia (i.e., first communications) distributed by the MAG 1302 to DLNA enabled STBs or TVs 1306. Ads may be retrieved and inserted based on a specific demographic profile for that customer. The demographic profile may be based on age, household income, previous purchasing behaviors, etc.

Figure 14:
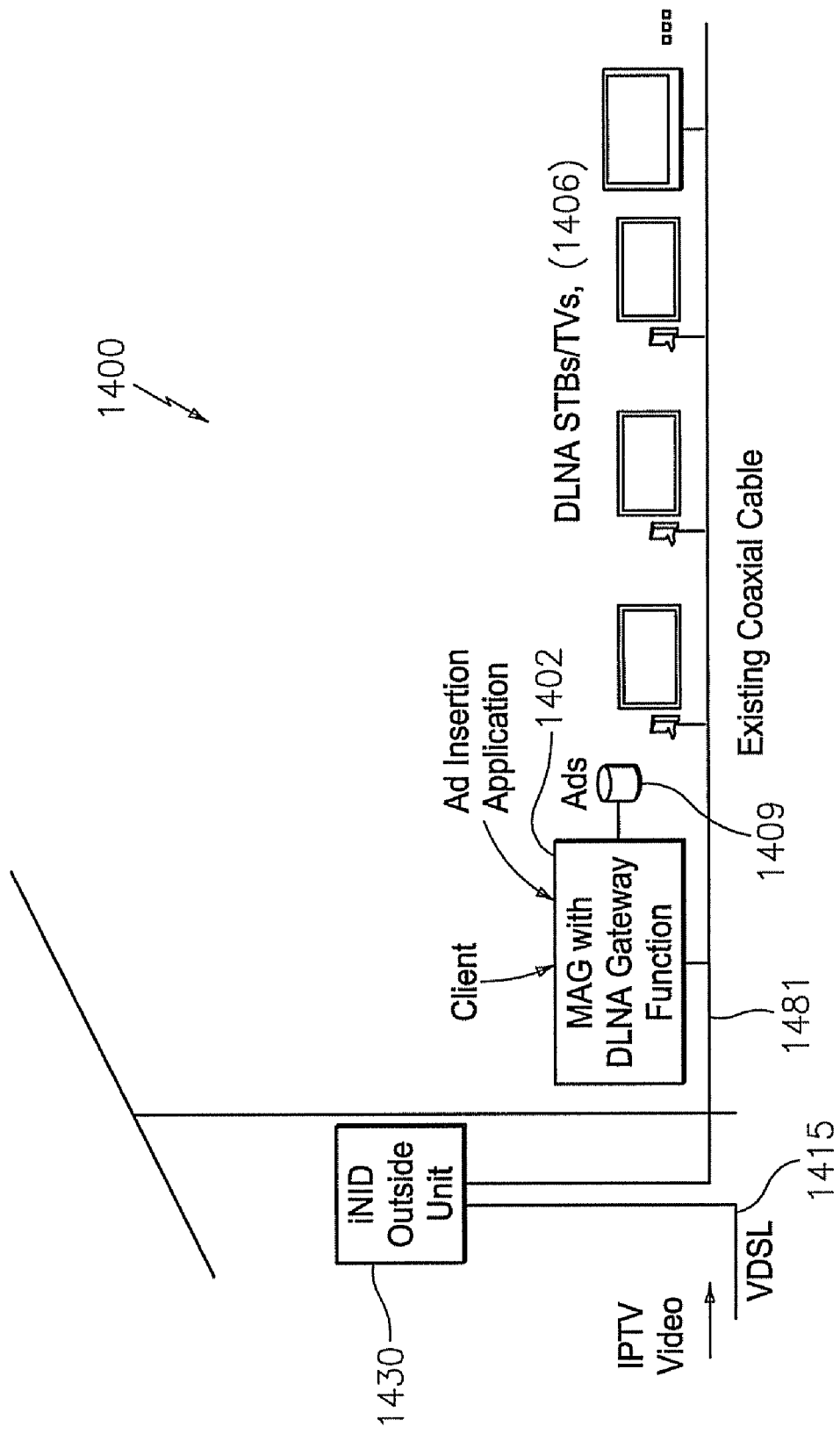
FIG. 14 illustrates a home network with local ad insertion in exemplary embodiments.

FIG. 14 illustrates a home network 1400 with local ad insertion in exemplary embodiments. The MAG 1402 receives IPTV video 1415 through an iNID unit 1430, such as a residential or access gateway. It is understood that embodiments of the invention are not limited to IPTV content, and the MAG may receive and distribute media from other sources such as DBS. The MAG 1402 executes a client application to interface with one or more advertisement distribution servers. The MAG 1402 also executes an ad insertion application to insert advertisements from the ad database 1409 based on conditions provided from the advertisement provider. Ads are retrieved from the ad database 1409 by the MAG 1402 during scheduled advertisement time slots and inserted into multimedia distributed by the MAG 1402 to DLNA enabled STBs or TVs 1406. The MAG 1402 serves as a gateway for routing IPTV signals to DLNA enabled devices 1406 over, e.g., coaxial cable 1481 in exemplary embodiments. The cable 1481 may utilize a standards technology (e.g., HomePlug® AV or other HomePNA™-approved home networking standard) for enabling signals, e.g., IPTV signals, to be transmitted over existing cables in the end user domain, e.g., cable 1481.

Figure 15:
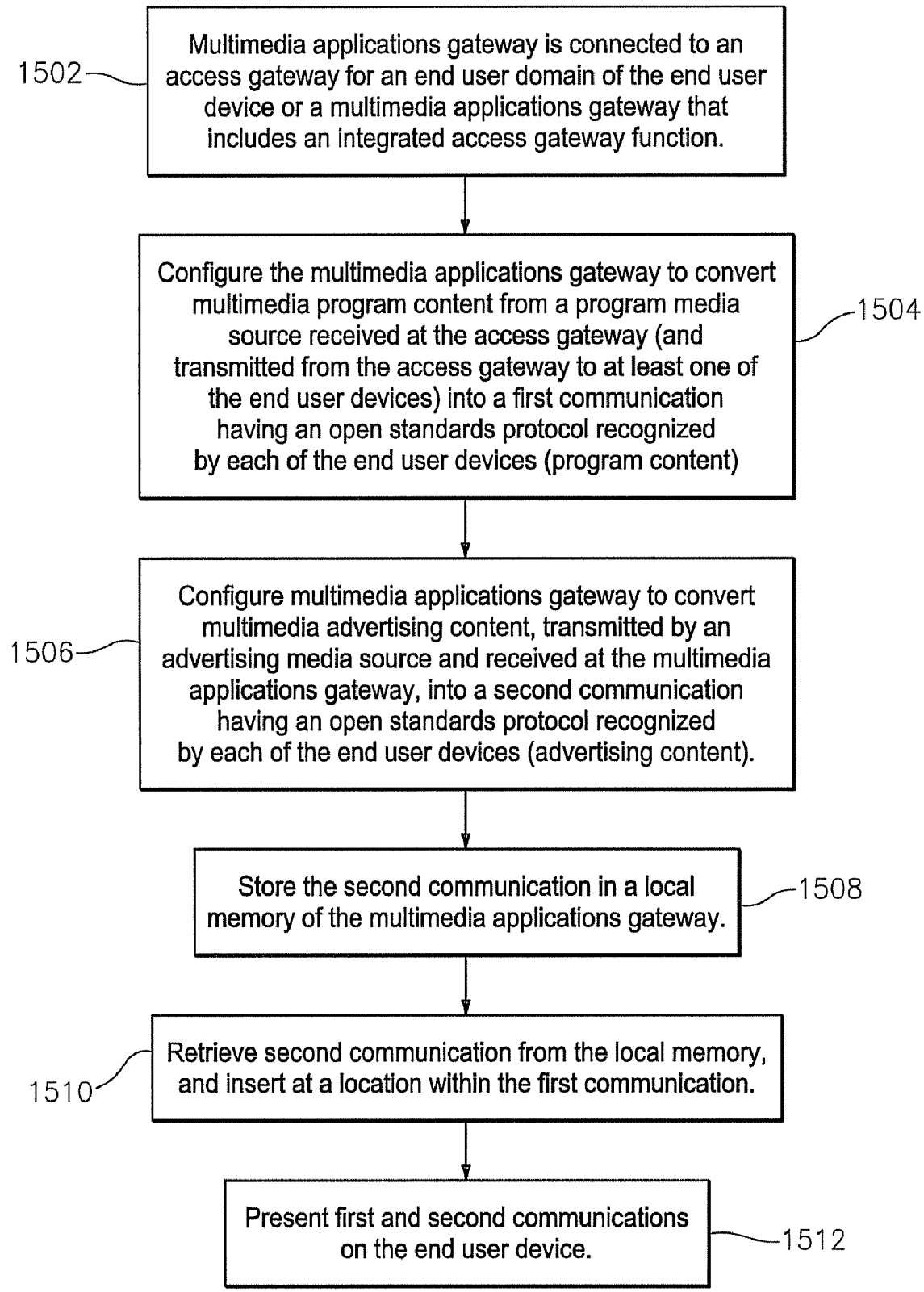
FIG. 15 is a flow diagram describing a process for implementing local ad insertion services in exemplary embodiments.

Turning now to FIG. 15, a flow diagram describing a process for implementing local ad insertion will now be described in exemplary embodiments. At step 1502, a multimedia applications gateway (e.g., MAG 102) is connected to an access gateway (e.g., 130) for an end user domain of the end user device (as shown, e.g., in FIG. 1A) or a multimedia applications gateway that includes an integrated access gateway function (as shown, e.g., in FIG. 1B). The access gateway is communicatively coupled to end user devices (e.g., devices 106/107) at the end user domain.

At step 1504, the multimedia applications gateway is configured to convert multimedia program content from a program media source received at the access gateway (and transmitted from the access gateway to at least one of the end user devices) into a first communication having an open standards protocol recognized by each of the end user devices. The first communication represents programming content.

At step 1506, the multimedia applications gateway is configured to convert multimedia advertising content, transmitted by an advertising media source and received at the multimedia applications gateway, into a second communication having an open standards protocol recognized by each of the end user devices. The second communication represents advertising content.

At step 1508, the second communication is stored in a local memory of the multimedia applications gateway. At step 1510, the second communication is retrieved from the local memory, inserted at a location within the first communication, and at step 1512, the first and second communications are presented on at least one of the end user devices.

The detailed description explains various exemplary embodiments, together with advantages and features, by way of example with reference to the drawings. As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a processor, the processor becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include a number a various embodiments. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method, comprising:
providing a multimedia applications gateway that is connected to an access gateway for an end user domain of an end user device, the access gateway communicatively coupled to the end user device, and the multimedia applications gateway is co-located with the end user device at the end user domain;
configuring the multimedia applications gateway to convert multimedia program content from a program media source received at the access gateway and transmitted from the access gateway to the end user device into a first communication having an open standards protocol recognized by the end user device, the first communication representing programming content;
configuring the multimedia applications gateway to convert multimedia advertising content, transmitted by an advertising media source and received at the multimedia applications gateway, into a second communication having the open standards protocol recognized by the end user device, the second communication representing advertising content;
storing the second communication in a local memory of the multimedia applications gateway; and
retrieving the second communication from the local memory, inserting the second communication at a location within the first communication, and presenting the first and second communications on the end user device;
wherein the multimedia advertising content is directly received at the multimedia applications gateway from the advertising media source, and the multimedia program content is received at the multimedia applications gateway via the access gateway.

2. The method of claim 1, wherein the location is determined by conditions defined by the advertising media source.

3. The method of claim 1, wherein the program media source is an Internet Protocol television provider.

4. The method of claim 1, wherein the program media source is a direct broadcasting satellite.

5. The method of claim 1, wherein the access gateway is communicatively coupled to the end user device via the multimedia applications gateway using wireless fidelity protocols.

6. The method of claim 1, wherein the end user device is enabled for communications having the open standards protocol, the end user device comprising a cell phone.

7. The method of claim 1, wherein the multimedia advertising content transmitted by the advertising media source is directed to a demographic profile associated with the end user domain.

8. The method of claim 7, wherein the demographic profile is based on age, household income of the end user domain, and previous purchasing activities of members of the end user domain.

9. A system, comprising:
a multimedia applications gateway connected to an access gateway for an end user device of an end user domain, the access gateway communicatively coupled to the end user device, and the multimedia applications gateway is co-located with the end user device at the end user domain;
an application executing on the multimedia applications gateway, the application implementing a method, comprising:
configuring the multimedia applications gateway to convert multimedia program content from a program media source received at the access gateway and transmitted from the access gateway to the end user device into a first communication having an open standards protocol recognized by the end user device, the first communication representing programming content;
configuring the multimedia applications gateway to convert multimedia advertising content, transmitted by an advertising media source and received at the multimedia applications gateway, into a second communication having the open standards protocol recognized by the end user device, the second communication representing advertising content;
storing the second communication in a local memory of the multimedia applications gateway; and
retrieving the second communication from the local memory, inserting the second communication at a location within the first communication, and presenting the first and second communications on the end user device;
wherein the multimedia advertising content is directly received at the multimedia applications gateway from the advertising media source, and the multimedia program content is received at the multimedia applications gateway via the access gateway.

10. The system of claim 9, wherein the location is determined by conditions defined by the advertising media source.

11. The system of claim 9, wherein the program media source is an Internet Protocol television provider.

12. The system of claim 9, wherein the program media source is a direct broadcasting satellite.

13. The system of claim 9, wherein the access gateway is communicatively coupled to the end user device via the multimedia applications gateway using wireless fidelity protocols.

14. The system of claim 9, wherein the end user device is enabled for communications having the open standards protocol, the end user device comprising a cell phone.

15. A computer program product comprising a non-transitory computer-readable storage medium having program code stored thereon, the program code causing a computer to implement a method, comprising configuring a multimedia applications gateway, which is connected to an access gateway that is communicatively coupled to an end user device of an end user domain, to convert multimedia program content from a program media source received at the access gateway and transmitted from the access gateway to the end user device into a first communication having an open standards protocol recognized by the end user device, the first communication representing programming content, and the multimedia applications gateway is co-located with the end user device at the end user domain;

configuring the multimedia applications gateway to convert multimedia advertising content, transmitted by an advertising media source and received at the multimedia applications gateway, into a second communication having the open standards protocol recognized by the end user devices, the second communication representing advertising content;

storing the second communication in a local memory of the multimedia applications gateway; and retrieving the second communication from the local memory, inserting the second communication at a location within the first communication, and presenting the first and second communications on the end user device;

wherein the multimedia advertising content is directly received at the multimedia applications gateway from the advertising media source, and the multimedia program content is received at the multimedia applications gateway via the access gateway.

16. The computer program product of claim 15, wherein the location is determined by conditions defined by the advertising media source.

17. The computer program product of claim 15, wherein the program media source is an Internet Protocol television provider.

18. The computer program product of claim 15, wherein the program media source is a direct broadcasting satellite.

19. The computer program product of claim 15, wherein the access gateway is communicatively coupled to the end user device via the multimedia applications gateway using wireless fidelity protocols.

20. The system of claim 9, wherein the multimedia applications gateway includes a cellular back-up plug-in module.

* * * * *